(12) United States Patent
Hancock et al.

(10) Patent No.: US 7,462,325 B2
(45) Date of Patent: Dec. 9, 2008

(54) LUMINESCENT POLYMER PARTICLES

(75) Inventors: Lawrence F. Hancock, North Andover, MA (US); Robert Deans, Grafton, MA (US); Wei Chen, Stillwater, OK (US)

(73) Assignee: Nomadics, Inc., Stillwater, OK (US)

( * ) Notice: Subject to any disclaimer, the term of this patent is extended or adjusted under 35 U.S.C. 154(b) by 756 days.

(21) Appl. No.: 09/997,999

(22) Filed: Nov. 30, 2001

(65) Prior Publication Data

US 2003/0134959 A1 Jul. 17, 2003

(51) Int. Cl.
*B32B 5/02* (2006.01)

(52) U.S. Cl. .............. 422/82.05; 526/285; 252/301.35; 422/82.08

(58) Field of Classification Search ................. 524/80; 436/172; 526/285; 422/82.05, 82.08; 252/301.35
See application file for complete search history.

(56) References Cited

U.S. PATENT DOCUMENTS

| | | | |
|---|---|---|---|
| 4,356,429 A | 10/1982 | Tang | |
| 4,687,732 A | 8/1987 | Ward et al. | |
| 4,927,768 A | 5/1990 | Coughlin et al. | |
| 4,946,890 A * | 8/1990 | Meador ...................... | 524/600 |
| 4,992,302 A | 2/1991 | Lindmayer | |
| 5,155,149 A | 10/1992 | Atwater et al. | |
| 5,194,393 A | 3/1993 | Hugl et al. | |
| 5,236,808 A | 8/1993 | Smothers | |
| 5,244,813 A | 9/1993 | Walt et al. | |
| 5,254,633 A | 10/1993 | Han et al. | |
| 5,364,797 A | 11/1994 | Olson et al. | |
| 5,414,069 A | 5/1995 | Cumming et al. | |
| 5,451,683 A | 9/1995 | Barrett et al. | |
| 5,511,547 A | 4/1996 | Markle et al. | |
| 5,512,490 A | 4/1996 | Walt et al. | |
| 5,532,129 A | 7/1996 | Heller | |
| 5,540,999 A | 7/1996 | Yamamoto et al. | |
| 5,546,889 A | 8/1996 | Wakita et al. | |
| 5,554,747 A | 9/1996 | Sharma et al. | |
| 5,556,524 A | 9/1996 | Albers | |
| 5,563,056 A | 10/1996 | Swan et al. | |
| 5,565,322 A | 10/1996 | Heller | |
| 5,580,527 A | 12/1996 | Bell et al. | |
| 5,585,646 A | 12/1996 | Kossovsky et al. | |
| 5,591,787 A | 1/1997 | Schlennert et al. | |
| 5,597,890 A | 1/1997 | Jenekhe | |
| 5,607,864 A | 3/1997 | Ricchiero et al. | |
| 5,679,773 A | 10/1997 | Holmes | |
| 5,700,696 A | 12/1997 | Chandross et al. | |
| 5,705,348 A | 1/1998 | Meade et al. | |
| 5,709,994 A | 1/1998 | Pease et al. | |
| 5,710,197 A | 1/1998 | Fischer et al. | |
| 5,723,218 A | 3/1998 | Haugland et al. | |
| 5,869,592 A | 2/1999 | Gagne et al. | |
| 5,925,517 A | 7/1999 | Tyagi et al. | |
| 6,020,426 A | 2/2000 | Yamaguchi et al. | |
| 6,259,277 B1 | 7/2001 | Tour et al. | |
| 6,589,731 B1 * | 7/2003 | Chen et al. ...................... | 435/5 |
| 6,713,298 B2 * | 3/2004 | McDevitt et al. ......... | 435/287.8 |
| 6,743,640 B2 | 6/2004 | Whitten et al. | |
| 6,783,814 B2 | 8/2004 | Swager et al. | |
| 7,208,122 B2 * | 4/2007 | Swager et al. ............ | 422/82.05 |
| 2002/0040805 A1 | 4/2002 | Swager | |

(Continued)

FOREIGN PATENT DOCUMENTS

DE 197 44 792 A1 4/1999

(Continued)

OTHER PUBLICATIONS

Halkyard, Carrie E., et al., "Evidence of Aggregate Formation for 2,5-Dialkylpoly (*p*-phenyleneethynylenes) in Solution and Thin Films," Macromolecules, Nov. 25, 1998, vol. 31, No. 25, pp. 8655-8659, American Chemical Society.

Pschirer, Niel G., et al., "Poly(fluorenyleneethynylene)s by Alkyne Metathesis: Optical Properties and Aggregation Behavior," Macromolecules, May 9, 2000, vol. 33, No. 11, pp. 3961-3963, American Chemical Society.

Place, Ileana, et al., "Stabilization of the Aggregation of Cyanine Dyes at the Molecular and Nanoscopic Level," Langmuir, Jul. 28, 2000, vol. 16, No. 23, pp. 9042-9048, American Chemical Society.

Chen, Liaohai, et al., "Tuning the Properties of Conjugated Polyelectrolytes through Surfactant Complexation," Journal of the American Chemical Society, 2000, vol. 122 No. 38, pp. 9302-9303.

Jones, Robert M., et al., "Superquenching and Its Application in J-Aggregate Cyanine Polymers," Langmuir, Apr. 4, 2001, vol. 17, No. 9, pp. 2568-2571, American Chemical Society.

(Continued)

*Primary Examiner*—Edward J Cain
(74) *Attorney, Agent, or Firm*—Wolf Greenfield & Sacks, P.C.

(57) ABSTRACT

This invention involves a series of articles, dispersions, compositions, methods, and kits. Several aspects of the invention involve dispersed particles made from polymers having a delocalized π-orbital backbone structure, as well as methods for making and using such particles. The delocalized π-orbital backbone allows the polymer to have a high degree of luminosity, useful in many embodiments of the invention. The polymers of this invention can also have bulky substituents to prevent intermolecular π-π interactions that can decrease luminosity. The polymer may also have charged side chains immobilized relative to the backbone, which can allow the polymer to be made into stably suspended micro- or nanoparticles dispersed in solution, sometimes with very narrow size distributions. In some embodiments, depending on the conditions used to synthesize and prepare the particles, the particles each consist of a single polymer molecule. Side groups, including biological, biochemical, or chemical molecules, can be attached to the polymer to provide additional functions, such as altering the luminosity of the polymer, or allowing the polymer to bind to certain molecules, such as in a chemical sensor or in a biological assay. As the binding of a molecule to a side group on the polymer can affect the structure of the polymer or alter the luminosity of the particle, the particles of the invention may be used, in certain embodiments, to detect the presence of single molecules.

30 Claims, 22 Drawing Sheets

U.S. PATENT DOCUMENTS

| | | |
|---|---|---|
| 2002/0051985 A1 | 5/2002 | Whitten et al. |
| 2002/0150697 A1 | 10/2002 | Swager et al. |
| 2002/0150759 A1 | 10/2002 | Jones et al. |
| 2002/0177136 A1 | 11/2002 | McBranch et al. |
| 2003/0054413 A1 | 3/2003 | Kumaraswamy et al. |
| 2003/0134959 A1 | 7/2003 | Hancock et al. |
| 2003/0178607 A1 | 9/2003 | Swager et al. |
| 2004/0043251 A1 | 3/2004 | Epstein et al. |
| 2004/0121337 A1 | 6/2004 | Deans et al. |
| 2004/0175768 A1 | 9/2004 | Kushon et al. |
| 2004/0235184 A1 | 11/2004 | Swager |
| 2004/0241768 A1 | 12/2004 | Whitten et al. |
| 2005/0014160 A1 | 1/2005 | Kumaraswamy et al. |
| 2006/0024707 A1 | 2/2006 | Deans et al. |

FOREIGN PATENT DOCUMENTS

| | | |
|---|---|---|
| DE | 198 06 037 A1 | 8/1999 |
| EP | 0442123 A1 | 8/1991 |
| EP | 1 011 154 A1 | 6/2000 |
| JP | 06-322078 | 11/1994 |
| WO | WO89/00593 | 1/1989 |
| WO | WO95/16681 A1 | 6/1995 |
| WO | WO99/57222 A1 | 11/1999 |
| WO | WO 01/57140 A1 | 8/2001 |
| WO | WO 02/16463 A2 | 2/2002 |
| WO | WO 03/048226 A2 | 6/2003 |
| WO | WO 2004/057014 A2 | 7/2004 |

OTHER PUBLICATIONS

Chen, Liaohai et al., "Highly Sensitive Biological and Chemical Sensors Based on Reversible Fluorescence Quenching in a Conjugated Polymer," Proceedings of the National Academy of Sciences of the United States of America, Oct. 26, 1999, vol. 96, No. 22, pp. 12287-12292.

Laibin, Luo, et al., "Thermodynamic Stabilization Mechanism of Block Copolymer Vessicles," Journal of the American Chemical Society, 2001, vol. 123, No. 5, pp. 1012-1013, American Chemical Society.

Wu, Chi, et al., "Novel Nanoparticles Formed via Self-Assembly of Poly(ethylene glyco-$b$-sebacic anhydride) and Their Degradation in Water," Macromolecules, Oct. 31, 2000, vol. 33, No. 24, pp. 9040-9043, American Chemical Society.

Heeger, Peter S., et al., "Making Sense of Polymer-Based Biosensors," Proceedings of the National Academy of Sciences of the United States of America, Oct. 26, 1999, vol. 96, No. 22, pp. 12219-12221.

Li, Mei, et al., "Novel Surfactant-Free Stable Colloidal Nanoparticles Made of Randomly Carboxylated Polystyrene Ionomers," Macromolecules, 1997, vol. 30, No. 7, pp. 2201-2203, American Chemical Society.

Zhang, Guangzhao, et al., "Formation of Novel Polymeric Nanoparticles," Accounts of Chemical Research, Jan. 6, 2001, vol. 34, No. 3, pp. 249-256, American Chemical Society.

Sigurd, Höger, et al., "Synthesis, Aggregation, and Adsorption Phenomena of Shape-Persistent Macrocycles with Extraannular Polyalkuly Substituents," Journal of the Amerian Chemical Society, May 22, 2001, vol. 123, No. 24, pp. 5651-5659, American Chemical Society.

Gaylord, Brent S., et al., "Water-Soluble Conjugated Oligomers: Effect of Chain Length and Aggregation on Photoluminescence-Quenching Efficiencies," Journal of the American Chemical Society, Jun. 8, 2001, vol. 123, No. 26, pp. 6417-6418, American Chemical Society.

Harrison, Benjamin S., et al., "Amplified Fluorescence Quenching in a Poly($p$-phenylene)-Based Cationic Polyelectrolyte," Journal of the American Chemical Society, Aug. 16, 2001, vol. 122, No. 35, pp. 8561-8562, American Chemical Society.

Q. Zhou & T.M. Swager, "Methodology for Enhancing the Sensitivity of the Fluorescent Chemosensors: Energy Migration In Conjugated Polymers," Journal of the American Chemical Society, vol. 117, No. 26, pp. 7017-7018, 1995, American Chemical Society.

J. Kim et al., "Nanoscale Fibrils and Grids: Aggregated Structures from Rigid-Rod Conjugated Polymers," Macromolecules, Mar. 9, 1999, vol. 32, No. 5, pp. 1500-1507, American Chemical Society.

A.W. Snow et al., "Synthesis and Evaluation of Hexafluorodimethylcarbinol Functionalized Polymers as Microsensor Coatings," Journal of Applied Polymer Science, vol. 43, pp. 1659-1671, 1991, John Wiley and Sons.

I.A. Levitsky et al., "Energy Migration in a Poly(phenylene ethynylene): Determination of Interpolymer Transport in Anisotropic Langmuir-Blodgett Films," Journal of the American Chemical Society, Feb. 4, 1999, vol. 121, No. 7, pp. 1466-1472, American Chemical Society.

K.A. Van Houten et al., "Rapid Luminescent Detection of Phosphate Esters in Solution and the Gas Phase Using (dppe)Pt$\{S_2C_2(2$-pyridyl)(CH$_2$CH$_2$OH)$\}$," Journal of the American Chemical Society, Nov. 13, 1998, vol. 120, No. 47, pp. 12359-12360, American Chemical Society.

Zhou, Qin, et al., "Fluorescent Chemosensors Based on Energy Migration in Conjugated Polymers: The Molecular Wire Approach to Increased Sensitivity," Journal of the American Chemical Society, 1995, vol. 117, No. 50, pp. 12593-12602, American Chemical Society.

Swager, Timothy M., et al., "Fluorescent studies of poly(p-phenyleneethylene)s: The Effect of Anthracene Substitution," Journal of Physical Chemistry, Mar. 30, 1995, vol. 1995, No. 99, pp. 4886-4893, American Chemical Society.

Swager, Timothy M., et al., "The Molecular Wire Approach to Sensory Signal Amplification," Accounts of Chemical Research, Apr. 4, 1998, vol. 31, No. 5, pp. 201-207, American Chemical Society.

Fu Dian-Kui, et al., "Alternating Poly(Pyridyl Vinylene Phenylene Vinylene)s: Synthesis and Solid State Organizations," Tetrahedron, Nov. 10, 1997, vol. 53, No. 45, pp. 15487-15494, Elsevier Sci. Ltd.

Miao Yi-Jun, et al., "Fluorescence Sensory Polymers Containing Rigid Non-Planar Aromatic Scaffolds," Proceedings of the 1997 Boston Meeting; Boston, MA, USA, Aug. 23-27, 1998, vol. 39, No. 2, pp. 1081-1082.

Yang, Jye-Shane, et al., "Fluorescent Porous Polymer Films as TNT Chemosensors: Electronic and Structural Effects," Journal of the American Chemical Society, Nov. 11, 1998, vol. 120, No. 46, pp. 11864-11873, American Chemical Society.

Weder, Christoph, et al., "Efficient Solid-State Photoluminescence in New Poly(2,5-dialkoxy-p-phenyleneethynylene)s," Macromolecules, Jul. 15, 1996, vol. 15, No. 29, pp. 5157-5165, American Chemical Society.

Gaylord et al., "DNA detection using water-soluble conjugated polymers and peptide nucleic acid probes," PNAS, Aug. 20, 2002, vol. 99, No. 17, pp. 10954-10957.

Kim et al., "Ultrafast Energy-Transfer Dynamics between Block Copolymer and π-Conjugated Polymer Chains in Blended Polymeric Systems," Chemistry of Materials, vol. 13(8), pp. 266-2674.

Kraft et al., "Electroluminescent Conjugated Polymers—Seeing Polymers in a New Light," Angew. Chem. Int. Ed. 1998, 37, 402-428.

Kushon et al., "Detection of DNA Hybridization via Fluorescent Polymer Superquenching," The ACS Journal of Surfaces and Colloids, Oct. 1, 2002, vol. 18, No. 20.

Peng et al., "Efficient Light Harvesting by Sequential Energy Transfer across Aggregates in Polymer of Finite Conjugational Segments with Short Aliphatic Linkages," J. Am. Chem. Soc., 2001, vol. 123, pp. 11388-11397.

Tan et al., "Photophysics, aggregation and amplified quenching of a wter-soluble poly(phenylene ethynylene)," Chem. Commun., 2002, pp. 446-447.

Walters et al., "Photophysical Consequences of Conformation and Aggregation in Dilute Solutions of π-Conjugated Oligomers," Langmuir, 1999, vol. 15, pp. 5676-5680.

Brabec, C. et al., "Plastic Solar Cells," *Adv. Funct. Mater.*, Feb. 2001 11:15-26, Wiley-VCH GmbH, Germany.

Cotts, P. et al., "Equilibrium Flexibility of a Rigid Linear Conjugated Polymer," *Macromolecules*, 1996 29:7323-7328, Amer. Chem. Soc.

Chemical & Engineering News, "A Better Sensor for Nerve Gas," Mar. 10, 2003, pp. 12.

Deans, R. et al., "A Poly(p-phenyleneethynylene) with a Highly Emissive Aggregated Phase," *J. Am. Chem. Soc.*, 2000 122:8565-8566, Amer. Chem. Soc.

Fiesel R. et al., "Aggregation-induced CD effects in chiral poly(2,5-dialkoxy-1,4-phenylene)s," *Acta Polym.*, 1998 49:445-449, Wiley-VCH Verlag GmbH, Germany.

Fiesel, R. et al., "A chiral poly(*para*-phenyleneethynylene) (PPE) derivative," *Macromol. Rapid Commun.*, 1998 19:427-431, Wiley-VCH Verlag GmbH, Germany.

Fiesel, R. et al., "On the Solid State Aggregation of Chiral Substituted Poly(*para*-phenylene)s(PPPs)," *Synthetic Metals*, 1999 102:1457-1458, Elsevier Science S.A.

Goldfinger, et al., "Fused Polycyclic Aromatics via Electrophile-Induced Cyclization Reactions: Applications to the Synthesis of Graphite Ribbons," *J. Am. Chem. Soc.*, 1994 116:7895-7896, Amer. Chem. Soc.

S. Hoger et al., "Synthesis, Aggregation, and Adsorption Phenomena of Shape-Persistent Macrocycles with Extraannular Polyalkyl Substituents," *J. Am. Chem. Soc.*, 2001 123:5651-5659, American Chemical Society.

Kim J. et al., "Ion-Specific Aggregation in Conjugated Polymers: Highly Sensitive and Selective Fluorescent Ion Chemosensors," *Angew. Chem. Int. Ed.*, 2000 39:3868-3872, Wiley-VCH Verlag GmbH, Germany.

Kim, J. et al., "Control of conformational and interpolymer effects in conjugated polymers," *Nature*, Jun. 2001 411:1030-1034, Macmillan Magazines Ltd.

Kim, J. et al., "Directing Energy Transfer within Conjugated Polymer Thin Films," *J. Am. Chem. Soc.*, 2001 123:11488-11489, American Chemical Society.

Kim, J. et .al., "Structural Control in Thin Layers of Poly(*p*-phenyleneethynlene)s: Photophysical Studies of Langmuir and Langmuir-Blodgett Films," *JACS Articles*, 2002 124:7710-7718, American Chemical Society.

Kohler, B. et al., "Novel Chiral Macrocycles Containing Two Electronically Interacting Arylene Chromophores," *Chem. Eur. J.*, 2001 7:3000-3004, Wiley-VCH Verlag GmbH, Germany.

Langeveld-Voss, B.M.W. et al., "Circular Dichroism and Circular Polarization of Photoluminescence of Highly Ordered Poly {3,4-di[(S)-2-methylbutoxy]thiopene}," *J. Am. Chem. Soc.*, 1996 118:4908-4909, American Chemical Society.

Levitsky, I.A. et al., "Mass and Energy Transport in Conjugated Polymer Langmuir-Blodgett Films: Conductivity, Fluorescence, and UV-Vis Studies," *Macromelecules*, 2001 34:2315-2319, American Chemical Society.

McQuade, D.T. et al., "Conjugated Polymer-Based Chemical Sensors," *Chem. Rev.*, 2000 100:2537-2574, American Chemical Society.

McQuade, D.T. et al., "Two-Dimensional Conjugated Polymer Assemblies: Interchain Spacing for Control of Photophysics," *J. Am. Chem. Soc.*, 2000 122:5885-5886, American Chemical Society.

Mitschke, U. et al., "The electroluminescence of organic materials," *J. Mater. Chem.*, 2000 10:1471-1507, The Royal Society of Chemistry.

Moon, J.H. et al., "Capture and detection of a quencher labeled oligonucleotide by poly(phenylene ethylene) particles," *Chem. Commun.*, 2003 104-405, Royal Society of Chemistry.

Norvez S. et al., "Epitaxygens: mesomorphic properties of triptycene derivatives," *Liquid Crystals*, May 1993 14:1389-1395, Taylor & Francis Ltd.

Oda M. et al., "Circularly-Polarized Electroluminscence from Liquid-Crystalline Chiral Polyfluorenes," *Adv. Mater.*, 2000 12:362-365, Wiley-VCH Verlag GmbH, Germay.

Oda M. et al., "Chiroptical properties of chiral-substituted polyfluorenes," *Synthetic Materials*, 2000 111-112:575-577, Elsevier Science S.A.

Peeters, E. et al., "Circularly-Polarized Electroluminscence from a Polymer Light-Emitting Diode," *J. Am. Chem. Soc.*, 1997 119:9909-9910, American Chemical Society.

Yang, J. et al., "Porous Shape Persistent Fluorescent Polymer Films: An Approach to TNT Sensory Materials," *J. Am. Chem. Soc.*, 1998 120:5321-5322, American Chemical Society.

Yang, J. et al., "Anomalous crystal packing of iptycene secondary diamides leading to novel chain and channel networks," *Tetrahedron Letters*, 2000 41:7911-7915, Elsevier Science Ltd.

Zhang, S. et al., "Fluorescent Detection of Chemical Warfare Agents: Functional Group Specific Ratiometric Chemosensors," *J. Am. Chem. Soc.*, 125:3420, (Mar. 2003).

Zhang, S. et al., Supplemental Information at http://pubs.acs.org/subscribe/journals/jacsat/suppinfo/-ja029265z/ja029265zsi20030125_030500.pdf (Mar. 2003).

"Institute for Soldier Nanotechnologies," slides (http://web.mit.edu/isn/industryday/index/html).

International Search Report for International Application Serial No. PCT/US2002/38321 (published as International Publication No. WO 2003/048226), issued by the ISA on Dec. 12, 2003.

Achyuthan, K.E., et al., "Fluorescence superquenching of conjugated polyelectrolytes: applications for biosensing and drug discovery," *J Mat Chem*, vol. 15, pp. 2648-2656 (2005).

Bergstedt, T., et al., "Superquenching of Fluorscent Polyelectrolytes and its Applications for Chemical and Biological Sensing," *Proc SPIE*, vol. 4279, pp. 94-100 (2001).

Chen, L., et al., "Surfactant-induced modification of quenching of conjugated polymer fluorescence by electron acceptors: applications for chemical sensing," *Chem Phys Lett*, vol. 330, pp. 27-33 (2000).

Fan, C., et al., "High-Efficiency Fluorescence Quenching of Conjugated Polymers by Proteins," *JACS*, vol. 124, pp. 5642-5643 (2002).

Fan, C., et al., "Photoluminescence Quenching of Water-Soluble Conjugated Polymers by Viologen Derivatives: Effect of Hydrophobicity," *Langmuir*, vol. 19, pp. 3554-3556 (2003).

Fan, C., et al., "Beyond superquenching: Hyper-efficient energy transfer from conjugated polymers to gold nanoparticles," *PNAS*, vol. 100, No. 11, pp. 6297-6301 (2003).

Gaylord, B.S., et al., "DNA Hybridization Detection with Water-Soluble Conjugated Polymers and Chromophore-Labeled Single-Stranded DNA," *JACS*, vol. 125, pp. 896-900 (2003).

Gaylord, B.S., et al., "SNP detection using peptide nucleic acid probes and conjugated polymers: Applications in neurodegenerative disease identification," *PNAS*, vol. 102, pp. 34-39 (2005).

Jones, R.M., et al., "Tuning of Superquenching in Layered and Mixed Fluorescent Polyelectrolytes," *JACS*, vol. 123, pp. 6726-6727 (2001).

Jones, R.M., et al., "Building highly sensitive dye assemblies for biosensing from molecular building blocks," *PNAS*, vol. 98, No. 26, pp. 14769-14772 (2001).

Kumaraswamy, S., et al., "Fluorescent-conjugated polymer superquenching facilitates highly sensitive detection of proteases," *PNAS*, vol. 101, pp. 7511-7515 (2004).

Kushon, S.A., et al., "Detection of Single Nucleotide Mismatches via Fluorescent Polymer Superquenching," *Langmuir*, vol. 19, 6456-6464 (2003).

Liu, B, et al., "Homogeneous Fluorescence-Based DNA Detection with Water-Soluble Conjugated Polymers," *Chem Mater*,vol. 16, 4467-4476 (2004).

Liu, B, et al., "Optimization of the Molecular Orbital Energies of Conjugated Polymers for Optical Amplification of Fluorescent Sensors," *JACS*, vol. 128, pp. 1188-1196 (2006).

Liu, B., et al., "Methods for strand-specific DNA detection with cationic conjugated polymers suitable for incorporation into DNA chips and microarrays," *PNAS*, vol. 102, No. 3, pp. 589-593 (2005).

Lu, L., et al., "Superquenching in Cyanine Pendant Poly(L-lysine) Dyes: Dependence on Molecular Weight, Solvent, and Aggregation," *JACS*, vol. 124, No. 3, pp. 483-488 (2002).

Lu, L., et al., "Surface-Enhanced Superquenching of Cyanine Dyes as J-Aggregates on Lapointe Clay Nanoparticles," *Langmuir*, vol. 18, pp. 7706-7713 (2002).

Lu, L., et al., "Biocidal Activity of a Light-Absorbing Fluorescent Conjugated Polyelectrolyte," *Langmuir*, vol. 21, pp. 10154-10159 (2005).

Lu, L., et al., "Cyanine Pendant" Polymers on Nanoparticles and in Solution; Superquenching and Sensing Applications, *Polym Mat Sci Eng*.

Lu, L., et al., "Self-Assembled "Polymers" on Nanoparticles: Superquenching and Sensing Applications" *Polym Mat Sci Eng*.

Rininsland, F., et al., "High-throughput kinase assays with protein substrates using fluorescent polymer superquenching," *BMC Biotech*, vol. 5, No. 16, pp. 1-6 (2005).

Rininsland, F., et al., "Metal ion-mediated polymer superquenching for highly sensitive detection of kinase and phosphatase activities," *PNAS*, vol. 101, No. 43, pp. 15295-15300 (2004).

Wang, S., et al., "Fluorescein Provides a Resonance Gate for FRET from Conjugated Polymers to DNA Intercalated Dyes," *JACS*, vol. 126, pp. 5446-5451 (2004).

Wang, D., et al., "Photoluminescence Quenching of Conjuagted Macromolecules by Bipyridinium Derivatives in Aqueous Media: Charge Dependence," *Langmuir*, vol. 17, pp. 1262-1266 (2001).

Wang, J., et al., "Photoluminescence of Water-Soluble Conjugated Polymers: Origin of Enhanced Quenching by Charge Transfer," *Macromolecules*, vol. 33, pp. 5153-5158 (2000).

Wang, D., et al., "Biosensors from conjugated polyelectrolyte complexes," *PNAS*, vol. 99, No. 1, pp. 49-53 (2002).

Whitten, D., et al., "From Superquenching to Biodetection: Building Sensors Based on Fluorescent Polyelectrolytes," *Optical Sensors and Switches*, p. 189-208 (2001).

Xia, W., et al., "Applications of Fluorescent Polymer Superquenching to High Throughput Screening Assays for Protein Kinases," vol. 2, No. 2, pp. 183-192 (2004).

Xia, W., et al., "A High-Throughput Screening Assay for Kinases and Phosphatases via Metal Ion-Mediated Fluorescent Polymer Superquenching," *Am Lab*, pp. 15-19 (2004).

Bustin, S. A., "Absolute quantification of mRNA using real-time reverse transcription polymerase chain reaction assays", Journal of Molecular Endicronology, 20000, pp. 169-193, vol. 25.

Dagani, R., "A Better Sensor for Nervew Gas", C&EN, Mar. 10, 2003, p. 12.

Famulok,, M., et al., "Nucleic acid aptamers-from selection in vitro to applications in vivo", Accounts of Chemical Research, 20000, pp. 591-599, vol. 33, No. 9.

Osborne, S. E., "Nucleic acid selection and the challenge of combinatorial chemistry", Chem. Rev. 1997, pp. 349-370, vol. 97.

* cited by examiner

LUMINESCENT POLYMER PARTICLES

BACKGROUND

1. Field of the Invention

This invention relates to luminescent particles and, in particular, to luminescent polymeric micro- and nanoparticles, as well as methods of making and using such particles.

2. Description of the Related Art

There is a high demand for chemical sensor devices for detecting low concentration levels of analytes present in the liquid and gaseous phase. Specificity to particular analytes is also generally desired.

Chemical sensor devices often involve luminescent materials because luminescence lifetimes and intensities can be sensitive to the presence of external species or analytes. Luminescent polymeric materials are particularly advantageous for sensor devices because the resulting luminescence and other physical properties can be optimized and/or tailored for particular analytes through chemical structure changes of the polymer.

Luminescent polyelectrolytes such as poly(phenylene)s or poly(phenylene vinylene)s have been described in, for example, Harrison et al., *J. Am. Chem. Soc.*, 122: 8561 (2000); Gaylord et al., *J. Am. Chem. Soc.*, ASA Release.

Other polymeric particles have been disclosed in for example, Zhang et al., Acct. Chem. Res. ASA Release; Lei et al., Marcomolecules, 30: 2201-2203 (1997); and Hoger, et al., *J. Am. Chem. Soc.* ASA Release. Additionally, patents that disclose particles include, for example, Haugland et al., U.S. Pat. No. 5,723,218; Fischer et al., U.S. Pat. No. 5,710,197; Ricchiero et al., U.S. Pat. No. 5,607,864; or Scoennert et al., U.S. Pat. No. 5,591,787. Fluorescent particles can be used, for example, as a substrate to attach molecules to, or as a label or tracer to detect various molecules, such as in a biological system or in a chemical assay. Fluorescent particles have also been used for diagnostic tests due to their size and ease of detection. Many different techniques can be used to detect particles, such as ordinary light or fluorescence microscopy, laser scanning confocal microscopy, or fluorescence spectroscopy and related techniques.

SUMMARY OF THE INVENTION

The present invention relates to luminescent polymeric micro- and nanoparticles, as well as methods of making and using such particles.

In one aspect, the invention comprises a polymeric article. In one set of embodiments, the polymeric article includes a particle defined at least in part by a polymer. In one embodiment, the polymer comprises an iptycene moiety. In another embodiment, the polymer comprises a structure:

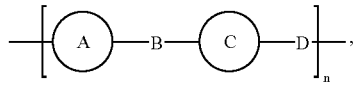

where n is at least 1, at least one of A and C comprises a bicyclic ring system, and at least one of B and D comprises a triple bond. In yet another embodiment, the polymer is a copolymer formed from a plurality of monomers, where at least one monomer comprises a structure:

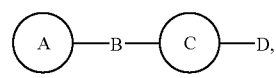

where at least one of A and C comprises a bicyclic ring system, and at least one of B and D comprises a triple bond. In still another embodiment, the polymer includes an energy migration pathway and a chromophore. In another embodiment, the polymer includes a backbone chain of monomers, wherein at least one monomer has a phosphorescent moiety.

In another set of embodiments, the polymeric article includes a particle defined at least in part by a luminescent polymer. In one embodiment, the luminescent polymer has a plurality of carbon-carbon triple bonds. In another embodiment, the luminescent polymer has a structure:

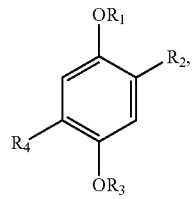

where $R_1$, $R_2$, $R_3$, and $R_4$ each comprise a carbon atom. In yet another embodiment, the luminescent polymer has a structure:

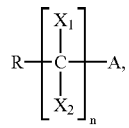

where n is at leat 3, R is a covalent bond, $X_1$ and $X_2$ each comprise one of a hydrogen atom or a halogen atom, and A comprises an atom. In still another embodiment, the luminescent polymer has a structure:

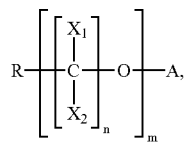

where n is at least 2, m is at least 2, R is a covalent bond, $X_1$ and $X_2$ each comprise one of a hydrogen atom or a halogen atom, and A comprises an atom. In another embodiment, the luminescent polymer is formed from a plurality of monomers, where at least one of the monomers includes a monomer having a smallest dimension of no less than about 0.45 nanometers.

In another set of embodiments, the polymeric article includes a particle defined at least in part by a polymer. The polymer includes a conjugated π-backbone chain, where the π-backbone chain defines, at least in part, a plane of atoms. The polymer has a first group and a second group attached to the π-backbone chain. The first group has a first fixed height above the plane of atoms and the second group has a second fixed height below the plane of atoms, where the sum of the first fixed height and second fixed height is at least about 0.45 nanometers.

In yet another set of embodiments, the polymeric article includes a polymeric article defined at least in part by a luminescent polymer molecule. In one embodiment, the luminescent polymer molecule has a smallest dimension of no less than about 5 nanometers. In another embodiment, the luminescent polymer is unable to coordinate a metal.

In another set of embodiments, the polymeric article includes a particle defined at least in part by a polymer. In one embodiment, the polymer is able to emit radiation with a quantum yield of at least 0.1. In another embodiment, the polymer is able to emit radiation with a quantum yield of at least about 0.2 times a quantum yield of the polymer in solution.

In yet another set of embodiments, the polymeric article includes a particle defined at least in part by a luminescent polymer. In one embodiment, the luminescent polymer includes an anthracene moiety. In another embodiment, the luminescent polymer is formed from a plurality of monomers, where at least one monomer comprises at least 3 benzene rings.

In another set of embodiments, the polymeric article includes a particle defined at least in part by a polymer having three or more monomer types. In one embodiment, at least one of the three or more monomer types is luminescent.

In still another set of embodiments, the polymeric article comprises a particle including at least one layer. The layer comprises a polymeric composition and a chromophore. The particle further comprises an activation site wherein the chromophore is able to be activated by an analyte at the activation site. The sensor also comprises an energy migration pathway within the polymeric composition, wherein energy can be transferred between the pathway and the activation site.

In yet another set of embodiments, the polymeric article includes a polymer. The polymer comprises an energy migration pathway capable of transporting an excitation energy. The amplification device also comprises a chromophore in electronic communication with the energy migration pathway. The chromophore is capable of emitting an enhanced radiation. In another set of embodiments, the polymeric article includes a luminescent particle comprising less than about 10 molecular binding sites.

In still another set of embodiments, the polymeric article is defined at least in part by a luminescent polymer formed from a plurality of monomers. In one embodiment, the luminescent polymer includes less than about 10 molecular binding sites, where at least one monomer has a smallest dimension of no less than about 0.45 nanometers. In another embodiment, the luminescent polymer molecule includes less than about 10 molecular binding sites, where the luminescent polymer molecule has a smallest dimension of no less than about 5 nanometers.

In another set of embodiments, the polymeric article includes a particle defined at least in part by a luminescent polymer. In one embodiment, the luminescent polymer comprises a pyridine moiety. In another embodiment, the luminescent polymer comprises a carbazole moiety. In yet another embodiment, the luminescent polymer is formed from a plurality of monomers, where at least one monomer comprises at least one delocalized π ring system. In yet another embodiment, the luminescent polymer has a structure:

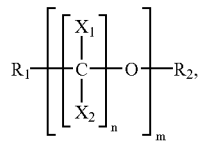

where n is at least 2, m is at least 2, $R_1$ and $R_2$ are each covalent bonds, and $X_1$ and $X_2$ each comprise one of a hydrogen atom or a halogen atom.

In another aspect, the invention comprises a dispersion. In one set of embodiments, the dispersion includes a polymer dispersed in a medium. In one embodiment, the polymer comprises an iptycene moiety. In another embodiment, the polymer has a structure:

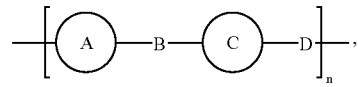

where n is at least 1, at least one of A and C comprises a bicyclic ring system, and at least one of B and D comprises a triple bond. In yet another embodiment, the polymer is a copolymer formed from a plurality of monomers, where at least one monomer has a structure:

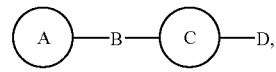

where at least one of A and C comprises a bicyclic ring system, and at least one of B and D comprises a triple bond. In still another embodiment, the polymer comprises a backbone chain of monomers, where at least one monomer includes a luminescent moiety.

In another set of embodiments, the dispersion includes a luminescent polymer dispersed in a medium. In one embodiment, the luminescent polymer is formed from a plurality of monomers, where at least one monomer has a smallest dimension of no less than about 0.45 nanometers. In another embodiment, the luminescent polymer has a smallest dimension of no less than about 5 nanometers.

In another set of embodiments, the dispersion includes a polymer that is dispersed in a medium. In one embodiment, the polymer is formed from a plurality of monomers, where at least one monomer includes an anthracene moiety. In another embodiment, the polymer comprises at least three monomer types, where at least one of the at least three monomer types is luminescent.

In another set of embodiments, the dispersion includes a luminescent polymer dispersed in a medium. In one embodiment, the luminescent polymer is formed from a plurality of monomers, wherein at least one monomer comprises a pyridine moiety. In another embodiment, the luminescent polymer is formed from a plurality of monomers, where at least one monomer comprises a carbazole moiety. In yet another embodiment, the luminescent polymer includes polyethylene glycol.

In yet another aspect, the invention comprises a composition. In one set of embodiments, the composition comprises a luminescent compound able to be quenched by a quenching agent with a Stem-Volmer constant greater than about $10^6$ $M^{-1}$.

In another set of embodiments, the composition includes a polymer comprising an iptycene moiety, where a biological, biochemical, or chemical molecule is bound to the polymer.

In still another set of embodiments, the composition includes a particle defined at least in part by a polymer. The particle includes a biological, biochemical, or chemical molecule. The polymer also includes an iptycene moiety. The present invention also comprises a method in another aspect of the invention. The method comprises the steps of providing a quenching agent, providing a luminescent compound able to be quenched by a quenching agent with a Stem-Volmer constant greater than about $10^6$ $M^{-1}$, exposing the luminescent compound to the quenching agent, and determining a luminosity of the luminescent compound.

In another aspect, the invention comprises a kit. The kit includes a luminescent polymer and a compound able to quench the luminescent polymer with a Stern-Volmer constant greater than about $10^6$ $M^{-1}$.

In still another aspect, the invention includes a method of making a polymeric article. The method comprises the steps of providing a composition comprising a structure:

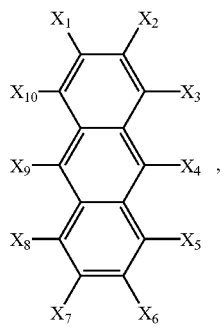

reacting the composition to produce a polymer, and forming the polymer into a luminescent particle. In the composition, $X_1, X_2, X_3, X_4, X_5, X_6, X_7, X_8, X_9$ and $X_{10}$ each comprise one of a hydrogen atom, a halogen atom, or an acetylide.

In another set of embodiments, the method includes the steps of providing a luminescent composition comprising an anthracene moiety, dispersing the luminescent composition in a medium incapable of dissolving the luminescent composition, and forming the luminescent composition into a particle.

In another set of embodiments, the method includes the steps of providing a luminescent composition comprising an anthracene moiety, dissolving the luminescent composition in a solvent, and mixing the solvent with a non-solvent to form a particle.

In another set of embodiments, the method comprises the steps of providing a particle comprising a polymer, and binding a biological, biochemical, or chemical molecule to the particle. The polymer comprises an iptycene moiety.

In one set of embodiments, the method comprises the steps of providing a polymer, and binding a biological, biochemical, or a chemical molecule onto the polymer. In one embodiment, the polymer includes an iptycene moiety. In another embodiment, the polymer has a structure:

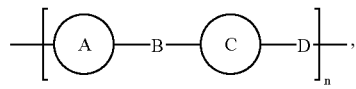

where n is at least 1, at least one of A and C comprises a bicyclic ring system, and at least one of B and D comprises a triple bond. In yet another embodiment, the polymer is a copolymer formed from a plurality of monomers, where at least one monomer has a structure:

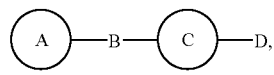

where at least one of A and C comprises a bicyclic ring system, and at least one of B and D comprises a triple bond. In still another embodiment, the polymer includes a luminescent polymer molecule having a smallest dimension of no less than about 5 nanometers.

In one aspect, the invention comprises a method of making a polymeric article. In one set of embodiments, the method comprises the steps of providing a particle comprising a polymer, and binding a biological, biochemical, or chemical molecule to the particle. In one embodiment, the polymer comprises a backbone chain of monomers, where at least one monomer comprises a luminescent moiety. In another embodiment, the polymer is a luminescent polymer formed from a plurality of monomers, wherein at least one monomer has a smallest dimension of no less than about 0.45 nanometers, and binding a biological, biochemical, or chemical molecule to the particle.

In another set of embodiments, the method comprises the steps of providing a luminescent polymer molecule having a smallest dimension of no less than about 5 nanometers, and binding a biological, biochemical, or chemical molecule to the particle.

In yet another set of embodiments, the method comprises the steps of providing a luminescent polymer dissolved in an organic solvent, and diluting the organic solvent with an aqueous solvent to produce a luminescent particle.

In still another set of embodiments, the method comprises the steps of providing a luminescent polymer, dissolving the luminescent polymer in a solvent, and mixing the solvent with a non-solvent to form a particle.

In another set of embodiments, the method comprises the steps of providing a luminescent polymer, dissolving the luminescent polymer in an organic solvent, and altering a temperature of the solvent to produce a luminescent particle.

In yet another set of embodiments, the method includes the steps of providing a composition, reacting the composition to produce a polymer, and forming polymer into a particle. In one embodiment, the composition comprises a structure:

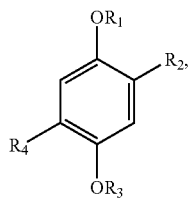

where $R_1$, $R_2$, $R_3$ and $R_4$ each comprise a carbon atom.

In another set of embodiments, the method includes the steps of providing a composition, reacting the composition to produce a luminescent polymer, and forming polymer into a luminescent particle. The composition includes a structure:

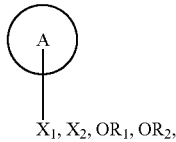

$X_1, X_2, OR_1, OR_2,$ where A comprises an aromatic group, $X_1$ and $X_2$ each comprise one of a hydrogen atom or a halogen atom, and $R_1$ and $R_2$ each comprise an alkyl group.

In another set of embodiments, the method includes the step of providing a composition having a structure:

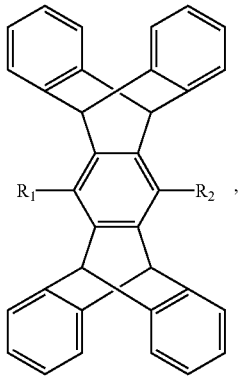

where $R_1$ and $R_2$ each comprise at least one of a hydrogen atom, a halogen atom, and an alkyl group. The method also comprises the steps of reacting the composition to produce a polymer, and forming the polymer into a particle.

In still another set of embodiments, the method includes the steps of providing a compound comprising an iptycene moiety, reacting the compound to produce a polymer, and forming the polymer into a particle.

In yet another set of embodiments, the method includes the steps of providing a luminescent composition comprising a pyridine moiety, suspending the luminescent composition in a medium incapable of dissolving the luminescent composition, and forming the luminescent composition into a particle.

In still another set of embodiments, the method includes the steps of providing a luminescent composition comprising a pyridine moiety, dissolving the luminescent composition in a solvent, and mixing the solvent with a non-solvent to form a particle.

In yet another set of embodiments, the method includes the steps of providing a luminescent composition comprising a carbazole moiety, dispersing the luminescent composition in a medium incapable of dissolving the luminescent composition, and forming the luminescent composition into a particle.

In still another set of embodiments, the method includes the steps of providing a luminescent composition comprising a carbazole moiety, dissolving the luminescent composition in a solvent, and mixing the solvent with a non-solvent to form a particle.

In yet another set of embodiments, the method includes the step of providing a composition comprising a delocalized π ring system. The composition has a formula:

$C_{6-a}N_aX_{6-a}$, where a=0 to 4, and each X comprises one of a hydrogen atom or a halogen atom. The method also comprises the steps of reacting the composition to produce a polymer, and forming the polymer into a luminescent particle.

In still another set of embodiments, the method includes the step of providing a composition having a structure:

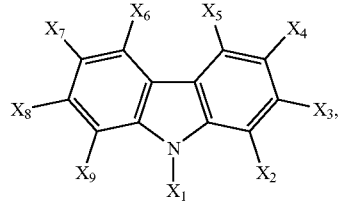

where $X_1$, $X_2$, $X_3$, $X_4$, $X_5$, $X_6$, $X_7$, $X_8$ and $X_9$ each comprise one of a hydrogen atom, a halogen atom, or an acetylide. The method also comprises the steps of reacting the composition to produce a polymer, and forming the polymer into a luminescent particle.

In yet another set of embodiments, the method includes the steps of providing a luminescent composition comprising polyethylene glycol, dispersing the luminescent composition in a medium incapable of dissolving the luminescent composition, and forming the luminescent composition into a particle.

In still another set of embodiments, the method includes the steps of providing a luminescent composition comprising polyethylene glycol, dissolving the luminescent composition in a solvent, and mixing the solvent with a non-solvent to form a particle.

In one aspect, the invention comprises a method of amplifying an emission. In one set of embodiments, the method comprises the steps of providing a particle comprising a polymer comprising an energy migration pathway and a chromophore, exposing the particle to a source of energy to form an excitation energy, and allowing the excitation energy to travel through the migration pathway and to transfer to the chromophore, causing an emission that is greater than an emission resulting from a polymer free of an energy migration pathway.

In another set of embodiments, the method comprises the steps of providing a particle comprising a polymer having an energy migration pathway where the polymer has reduced π-stacking, exposing the particle to the source of energy to form an excitation energy, and allowing the excitation energy to travel through the migration pathway to cause an emission that is greater than an emission resulting from a polymer free of an energy migration pathway.

In one aspect, the invention comprises a method of detecting an analyte. In one set of embodiments, the method includes the steps of providing a particle comprising a polymer, exposing the particle to a source of energy to cause an emission of radiation, exposing the particle to a medium suspected of containing an analyte able to cause a change in the emission of radiation, and detecting the presence of the analyte by detecting the change in emission of radiation. In one embodiment, the polymer includes a structure:

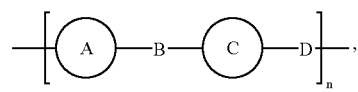

where n is at least 1, at least one of A and C comprises a bicyclic ring system, and at least one of B and D comprises a triple bond. In another embodiment, the polymer is a copoly mer formed from a plurality of monomers, where at least one of the monomers has a structure:

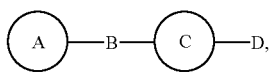

where at least one of A and C comprises a bicyclic ring system, and at least one of B and D comprises a triple bond.

In another set of embodiments, the method includes the steps of providing a luminescent polymer molecule having a smallest dimension of no less than about 5 nanometers, exposing the particle to a source of energy to cause an emission of radiation, exposing the particle to a medium suspected of containing an analyte able to cause a change in the emission of radiation, and detecting the presence of the analyte by detecting the change in emission of radiation.

In another set of embodiments, the method includes the steps of providing a luminescent polymer molecule, binding less than about 10 molecules of a species to the luminescent polymer molecule, and measuring a detectable change in a physical property of the luminescent polymer molecule.

In yet another set of embodiments, the method includes the steps of providing a luminescent particle, binding less than about 10 molecules of a species to the luminescent particle, and measuring a detectable change in a physical property of the luminescent particle.

In another aspect, the invention comprises a sensor. In one set of embodiments, the sensor is defined at least in part by a polymer. The sensor also includes a source of energy applicable to the polymer to cause emission of radiation, and an emission detector positionable to detect the emission. In one embodiment, the polymer has a structure:

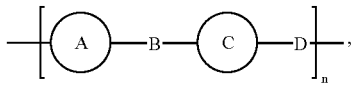

where n is at least 1, at least one of A and C comprises a bicyclic ring system, and at least one of B and D comprises a triple bond. In another embodiment, the polymer is a copolymer formed from a plurality of monomers, where at least one monomer has a structure:

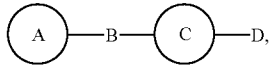

where at least one of A and C comprises a bicyclic ring system, and at least one of B and D comprises a triple bond. In yet another embodiment, the polymer includes a luminescent polymer molecule having smallest dimension of no less than about 5 nanometers.

Other advantages, novel features, and objects of the invention will become apparent from the following detailed description of the invention when considered in conjunction with the accompanying drawings, which are schematic and which are not intended to be drawn to scale. In the figures, each identical, or substantially similar component that is illustrated in various figures is represented by a single numeral or notation. For purposes of clarity, not every component is labeled in every figure, nor is every component of each embodiment of the invention shown where illustration is not necessary to allow those of ordinary skill in the art to understand the invention.

BRIEF DESCRIPTION OF THE DRAWINGS

Non-limiting embodiments of the present invention will be described by way of example with reference to the accompanying drawings in which.

DETAILED DESCRIPTION

Figure 1:
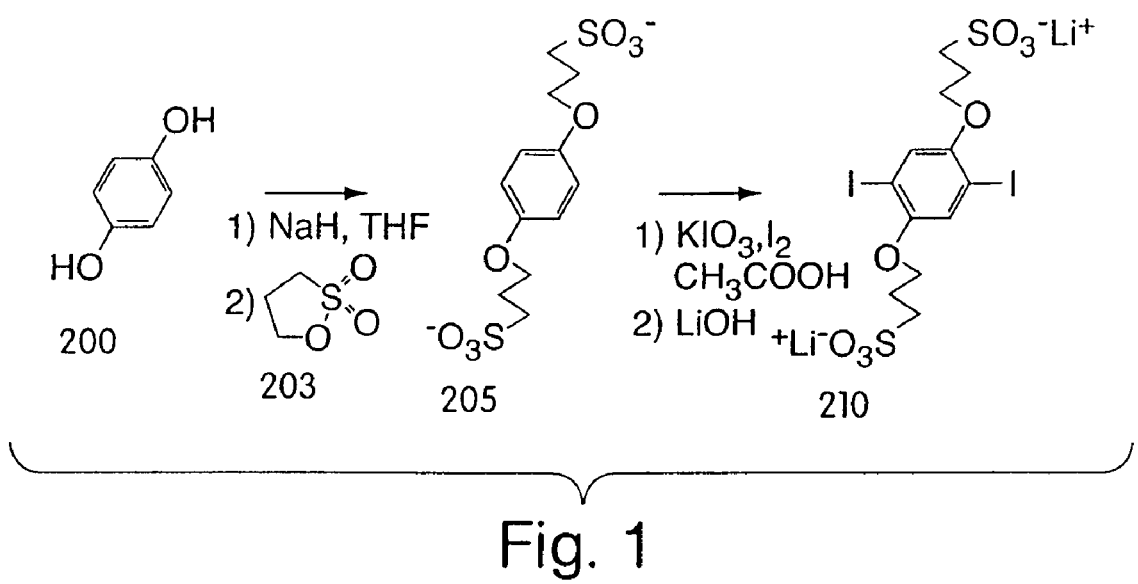
FIG. 1 is a depiction of part of a synthetic chemical pathway.

This invention involves a series of articles, dispersions, compositions, methods, and kits. Several aspects of the invention involve dispersed particles made from polymers having a delocalized π-orbital backbone structure, as well as methods for making and using such particles. The delocalized π-orbital backbone allows the polymer to have a high degree of luminosity, useful in many embodiments of the invention. The polymers of this invention can also have bulky substituents to prevent intermolecular π-π interactions that can decrease luminosity. The polymer may also have charged side chains immobilized relative to the backbone, which can allow the polymer to be made into stably suspended micro- or nanoparticles dispersed in solution, sometimes with very narrow size distributions. In some embodiments, depending on the conditions used to synthesize and prepare the particles, the particles each consist of a single polymer molecule. Side groups, including biological, biochemical, or chemical molecules, can be attached to the polymer to provide additional functions, such as altering the luminosity of the polymer, or allowing the polymer to bind to certain molecules, such as in a chemical sensor or in a biological assay. As the binding of a molecule to a side group on the polymer can affect the structure of the polymer or alter the luminosity of the particle, the particles of the invention may be used, in certain embodiments, to detect the presence of single molecules.

A "particle," as used herein, refers to an isolated, independent structure, including at least one molecule. The particle may have a diameter of less than 1 mm; in some cases, the diameter may be less than 500 μm; in other cases, less than 50 μm; in other cases, less than 500 nm; and in still other cases, less than 5 nm. "Particles" of the invention can include aggregates of molecules. For example, the molecules within the particle may or may not be covalently bound to each other, e.g. they may be aggregated due to ionic or van der Waals interactions, hydrophobic forces, steric interactions of entangled molecules, and the like. Alternatively, some or all molecules defining a particle can be covalently attached to adjacent molecules.

"R" generally refers to a hydrocarbon group (including cyclic hydrocarbon groups), optionally interrupted by hetero groups. As used herein, "hydrocarbon," "alkyl," and similar terms include alkyl, alkenyl, alkynyl, cycloalkyl, aryl, alkaryl, aralkyl, and the like. Examples of such hydrocarbon groups may include methyl, propenyl, ethynyl, cyclohexyl, phenyl, tolyl, benzyl, hydroxyethyl and the like. Hetero groups may include —O—, —CONH—, —CONHCO—, —NH—, —CSNH—, —CO—, —CS—, —S—, —SO—, —(OCH$_2$CH$_2$)$_n$— (where n may range from 1 to 10), —(CF$_2$)$_n$— (where n may range from 1 to 10), olefins, and the like. "Hydrocarbon," "alkyl," and similar terms may also include alcohols and hydrogen. By way of example, "R" may be an alkyl group, preferably having 1 to 24 carbon atoms, more preferably 1 to 18 carbon atoms; an alkenyl group, preferably having 2 to 4 carbon atoms; an alkylamino group, preferably having 1 to 8 carbon atoms, and optionally substituted on the nitrogen atom with one or, preferably two alkyl groups, preferably having 1 to 4 carbon atoms; an alkyl group, preferably having 1 to 4 carbon atoms, having a five- or six-membered heterocyclic ring as a substitutent; an allyloxyalkyl group, preferably having up to 12 carbon atoms; an alkoxyalkyl group, preferably having a total of 2 to 12 carbon atoms; an aryloxyalkyl group, preferably having 7 to 12 carbon atoms; an aralkyl group, or the like.

The term "determining" refers to quantitative or qualitative analysis of a species via, for example, spectroscopy, radioactive counting, HPLC analysis, nuclear magnetic resonance, or the like. "Determining" also means detecting or quantifying interaction between species, e. g. detecting or quantifying a binding interaction between two species.

"Derivative," "chemical derivative," "derivatizing," and similar terms are given their ordinary meanings as is well-known in the field of chemistry. A derivative may be any chemical substance structurally related to another chemical substance and at least theoretically derivable from it.

A "dalton" (Da) is an alternate name for the unified atomic mass unit (grams/mole). The dalton is accepted by SI as an alternate name for the unified atomic mass unit. Similarly, a "kilodalton" (kDa) is 1000 daltons.

A "sample suspected of containing" a particular component refers to a sample with respect to which the content of the component is unknown. "Sample" includes both chemical samples and naturally-occurring samples, such as physiological samples from humans or other animals, samples from food, etc. Typical naturally-occurring samples may include saline, cells, blood, urine, ocular fluid, saliva, fluids, lymph nodes, needle biopsies, etc.

As used herein, "an aqueous solvent" and an "organic solvent" are given their ordinary meanings as is well-known in the field of chemistry. An aqueous solvent is a solvent with a relatively high dielectric constant, and an organic solvent is a solvent with a relatively low dielectric constant. Additionally, as used herein, a "solvent of the opposite phase" refers to a solvent having a phase or a dielectric constant opposite to a reference solvent. For example, when referring to an organic solvent, a solvent of the opposite phase would be an aqueous solvent, and vice versa.

In a "luminescent" molecule, when a form of energy, such as a photon, interacts with a molecule, that energy is absorbed by an electron of an atom within the molecule, allowing the electron to go from a lower energy state into an "excited" or higher energy state. The site within the molecule where the energy is absorbed may be referred to as the activation site. The energy absorbed by the molecule may be referred to as an "exciton." Although an exciton is not a physical particle, it can be analyzed as though it were a particle located within the molecule. The absorbed energy later can be released as a photon, as the electron descends from the higher energy state into a lower state. One form of energy excitation is by the interaction of the molecule with an incident photon corresponding to visible light, ultraviolet light, or other electromagnetic frequencies, in which case the energy of the incident photon is termed the "excitation energy" or "excitation frequency." However, other methods of excitation are also possible, such as through incident electrons, electrical current, friction, heat, chemical or biological reactions, the influence of sound waves, or other methods that are known or would be apparent to those of ordinary skill in the art.

The excited electron may descend to a lower energy state by one of two methods. During fluorescence an electron travels directly to the ground state, releasing a photon in the process. However, during phosphorescence, the electron descends to another excited state before releasing a photon and returning to the ground state. Typically, fluorescence occurs on a shorter time scale than does phosphorescence. Phosphorescence may occur for a considerable period of time after the excitation source has been withdrawn, up to several seconds or minutes, while fluorescence stops almost immediately after the excitation source has been withdrawn. In addition, some materials may be fluorescent without being phosphorescent, or vice versa. The location within the molecule where the photon is emitted by the electron as it descends from the excited energy state typically is referred to as the chromophore of the molecule.

The photon emitted by the electron as it descends from the excited energy state may have any wavelength or frequency. This frequency or wavelength is typically referred to as the "emission frequency" or the "emission wavelength." In certain cases, more than one photon may be emitted by the electron as it descends from the excited energy state. The electron may also descend to a lower energy state without releasing a photon, optionally followed by release of a photon. For example, conformation changes in vibrational energy (e.g., heat energy or kinetic energy), or other electronic rearrangements are avenues through which an electron can descend to a lower energy state without, or prior to, emitting a photon.

Materials that may be luminescent include inorganic or organic materials, such as polymers. The luminescence of the material may be facilitated by an electronic structure caused by various means, such as by coordinated metal ions. In some types of molecules, the luminescent properties are due to the presence of delocalized π-orbital structures within the molecule. Typically, in a delocalized π-orbital structure, the electrons in the π-orbitals forming the π bond cover multiple atom centers, which are said to be in "π-electron communication" or "π-communication." As used herein, "π-orbitals," "πstructures," "π-backbone," and the like are given their ordinary definitions as is understood in organic and inorganic chemistry, where the electrons in orbitals between adjacent atoms are shared, creating a chemical bond between the adjacent atoms. Similarly, "π-stacking" or "intermolecular π-π interactions" generally refers to structures in which the π-orbitals of nearby molecules are adjacent, overlapping, or otherwise affect each others' properties, for example, by interfering with the release of photons, causing a decrease in luminosity.

Delocalized π-orbitals may be formed in a variety of structures, for example, but not limited to, double bonds, triple bonds, benzene rings, naphthalene rings, anthracene rings, pyridines, carbazoles, and the like. Other aromatic systems having similar arrangements of atoms to produce delocalized π-bonds are also within the scope of the invention, as well as moieties containing delocalized π structures having additional substituents, such as oxygen, sulfur, nitrogen, a halogen, or the like. For example, nitrogen atoms may be substituted for carbon atoms within a delocalized π structure, such as in pyridines and similar compounds.

When a quantum of energy is absorbed by a molecule, the exciton may be transmitted along the energy migration pathway of the polymer in a process referred to as intrachain jumping, for example, along a π backbone due to the presence of delocalized π-orbitals. The π backbone, or other analogous structures, that are able to transmit the exciton are typically referred to as "energy migration pathways." In some cases, the π backbone amplifies the effect of the absorbed energy quanta, as the effects of the exciton can be transmitted along the energy migration pathway to more than one chromophore. Besides intrachain transmission, the exciton can also be transmitted between different molecules, in a process referred to as interchain jumping. This transmission may occur by any means, for example, transmission through the release of a photon from one molecule and the absorbance of that photon by another molecule or the same molecule, transmission through the transfer of kinetic energy, transmission due to the overlap of π-orbitals between the different molecules, or longer range energy transport through what are commonly called Dexter or resonant energy transfer mechanisms. π backbone structures may be used, for example, to amplify the sensitivity of the polymer to external compounds.

The polymers of the present invention may be prevented from π-stacking through the use of "bulky" monomers that prevent adjacent or nearby neighboring molecules from touching or interacting with each other. This may be done, for example, to prevent intermolecular π-π interactions from occurring that cause the luminosity of the polymeric particle to decrease. For example, two adjacent or nearby polymer molecules, having delocalized π-orbitals, can interfere with the release of photons from each molecule. Also, under certain circumstances, one polymer molecule may self-interfere. As the interference is typically caused by interacting π-orbitals, in one set of embodiments, the polymers of the present invention may include bulky monomers or substituents defined by any chemical moiety able to keep nearby polymer π-orbitals separated. For example, the bulky groups may be comprised of surfactants, proteins, or organic molecules. In some instances, the bulky groups may comprise a pentiptycene moiety, such as that shown in molecule 270 in FIG. 3. In other embodiments, the bulky groups may consist of triptycenes, or other iptycene and iptycene-related moieties.

In some embodiments, the bulky group may have a smallest dimension of no less than about 0.25 nm. In other embodiments, the smallest dimension can be less than about 0.30 nm, 0.35 nm, 0.40 nm, 0.45 nm, 0.50 nm, or 0.60 nm. The bulky groups can be located anywhere within the polymer. For example, the bulky groups may be adjacent to or be part of the backbone of the polymer. The bulky groups may also be attached to the polymer chain through the use of pendant groups connected to the backbone of the polymer, or be randomly distributed within the polymer. In some cases, the bulky groups can include delocalized π-orbital structures, such as double bonds, triple bonds, benzene moieties, anthracenes, pyridines, carbazoles, or the like. In certain embodiments, the bulky groups consist of several benzene rings, interlocking in a bicyclic structure, for example, as in a pentiptycene moiety.

By minimizing the intermolecular π-π interactions between nearby or adjacent polymers, the shape of the luminescence emission spectra may not change significantly as the environment of the polymer molecule is changed, for example, from an organic phase to an aqueous phase or vice versa. Thus, the polymers may remain luminescent as the polymers are formed into particles, for example, as in a dispersion. The emission spectra of the particles may therefore not be dependent on the size of the particle, or the environment that the particle is located in. Thus, for example, the polymer may be luminous when dissolved in an organic solvent, and when dispersed in an aqueous solvent. The luminosity of the particles may not decrease, or the spectra of the particles may not shift, after at least one day, preferably at least one week, more preferably at least one month, more preferably at least two months, or still more preferably, at least three months or longer.

Additional chemical groups or functionalities may be attached to the bulky groups. The chemical groups or functionalities can be attached by any suitable means, such as through ionic, covalent, or hydrogen bonds. The chemical groups can, for example, provide additional chemical functionalities to the molecule, assist in polymer separation, or assist in the dissolution, suspension, or dispersion of the polymer in the surrounding fluid or other media.

In another set of embodiments, the invention provides a particle having a polymer that includes a bicyclic ring system, for example, as in an iptycene moiety or a related molecular structure. The iptycene moiety or related molecular structures generally have a [2.2.2] bicyclic ring system, formed from the intersection of geometric planes, for example, as defined by aromatic rings fused with the [2.2.2] bicyclic ring system ("arene planes"); however, other shape-persistent ring systems can also be used. The aromatic rings on each of the branches of the [2.2.2] bicyclic ring system, may be connected to, for example, another [2.2.2] bicyclic ring system, or a delocalized π-orbital structure. Those of ordinary skill in the art will recognize that, using selected dienes or dienophiles, additional syntheses may result in any of a wide variety of molecules useful in the present invention.

Figure 2:
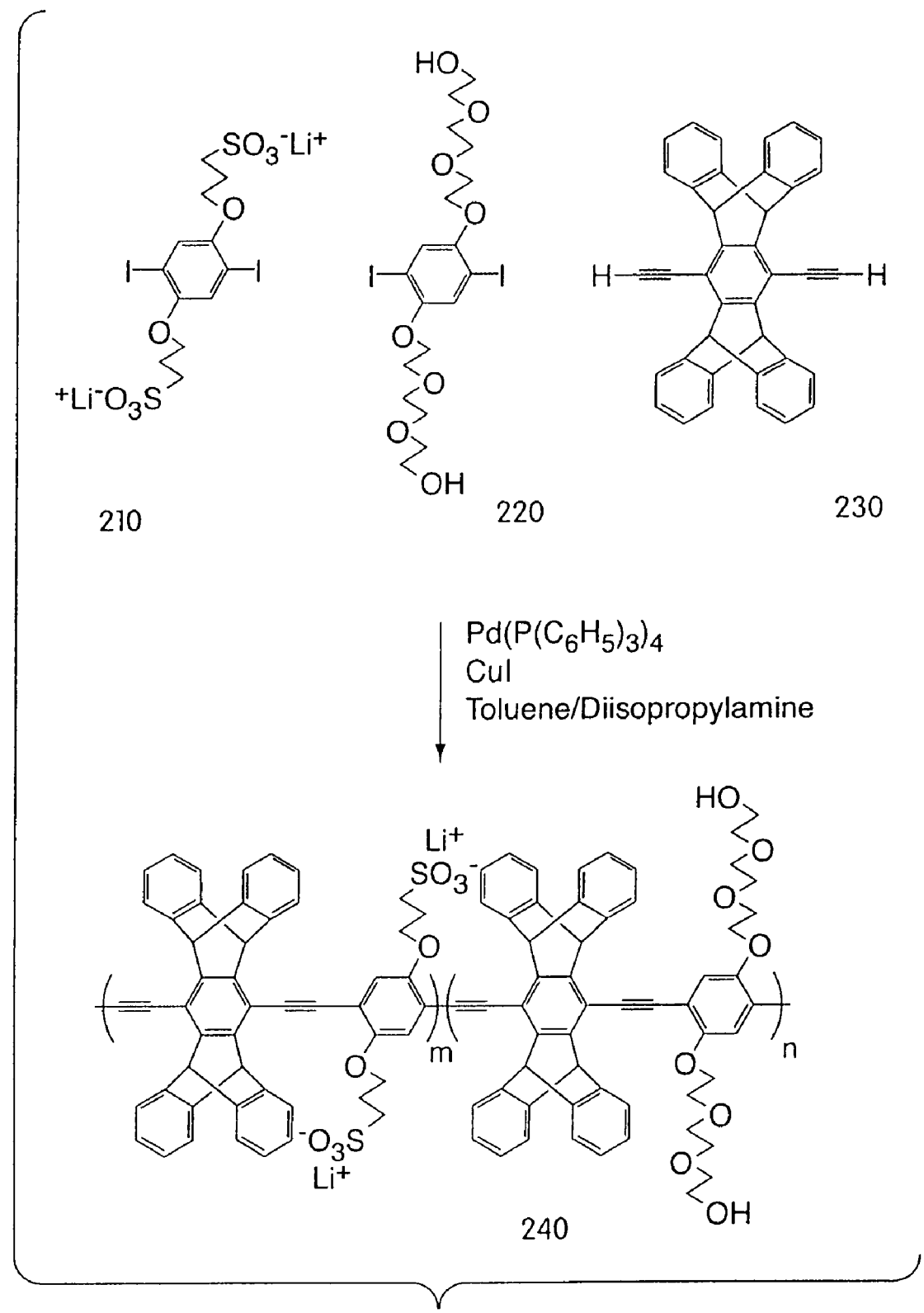
FIG. 2 is a depiction of part of a synthetic chemical pathway, continued from FIG. 1.

Any of the polymers of the invention may include a backbone chain of atoms. The longest chain of covalently bonded atoms within the polymer or copolymer is typically called the backbone of the polymer. The backbone may have other substituents attached to it or interspersed with it, for example, additional polymer chains, or other species or derivatives, for example, a poly(ethylene) oxide chain, such as the ones illustrated in FIG. 16. The backbone may also include interspersed rings of atoms, such as, for example, benzene rings, as long as the overall structure of the backbone is continuous. This may be seen, for example, in FIG. 2, where the backbone chain has benzene rings interspersed within the backbone chain of the molecule. In certain embodiments, the backbone may include various delocalized π structures.

Figure 21:
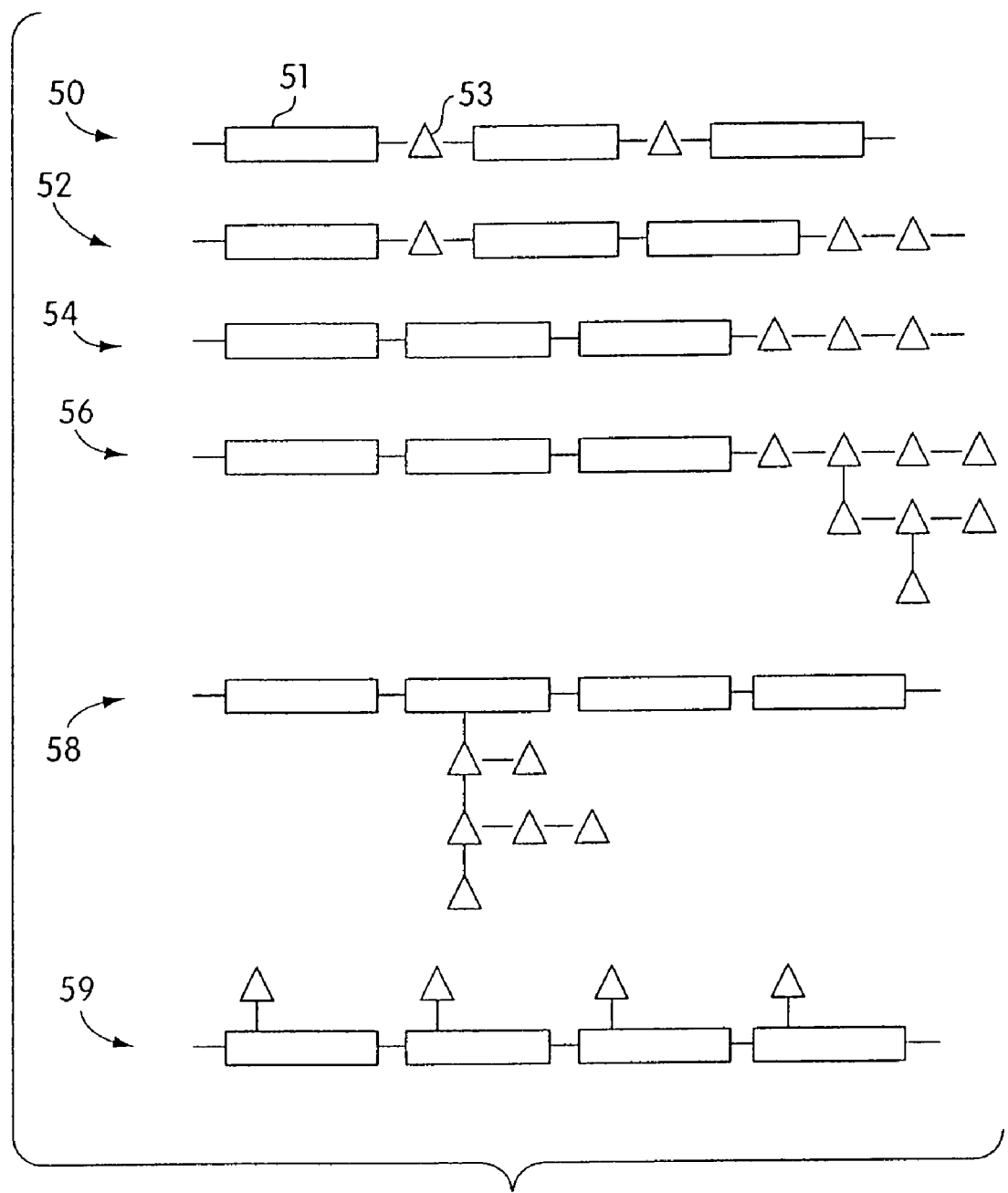
FIG. 21 is a schematic diagram of various copolymers of the invention, where the copolymer is made up of two monomer types.

In embodiments where the polymer is composed of more than one monomer type (i. e., a "copolymer"), the monomer types forming the copolymer may be arranged in any fashion. Each of the monomer types may also be referred to as a repeat unit. As an example of a monomer arrangement, if there are two monomer types, they may be arranged in an alternating fashion, for example, as shown schematically in FIG. 21, where one polymer type is represented by a rectangle 51 and a second polymer type is represented by a triangle 53. The monomers may be arranged, for example, in an alternating fashion 50, a random fashion 52, or a blocky fashion 54. In addition, branches off of the copolymer backbone are also possible. For instance, one or both of the monomer types may be branches, forming a blocky branched scheme 56. The backbone in other embodiments may consist of one polymer type, and a second polymer type may branch off the first polymer type, forming a grafted copolymer 58. The branches may be randomly distributed on the copolymer backbone or they may be regularly situated on each monomer, forming a side chain-modified copolymer 59. Other arrangements of the monomer types within the copolymer are also within the scope of the present invention. For example, the polymer may have arrangements that are combinations of the arrangements depicted in FIG. 21, such as a random, branched arrangement of monomer types. Additional monomer types (e. g., as in a terpolymer having three or more repeat units, or a higher order copolymer having multiple repeat units) may also be distributed within the polymer in any fashion, for example, as in an alternating fashion, a random fashion, or a block fashion. Additional non-monomer groups can also be attached to the polymer at any position, for example, at one or both termini of the copolymer, as a substitute for one of the monomers, or attached to a side chain of the monomer.

The monomer types may have any distribution ratio. For example, in one embodiment, there may be two monomer types, having a 50:50 ratio. In other embodiments, the ratio between the two monomer types may be 1:2, 1:3, 1:5, 1:10, 1:50, 1:100, 1:1000, or 1:10,000. Any monomer type may be the most prevalent monomer type. Other ratios of the monomer types may also be possible. For example, in a triblock polymer, there may be three monomers having any distribution ratio, for example, 1:1:1, or 1:2:3.

The polymer molecule may have any size or molecular weight. In some cases, the molecule may consist of at least 5 monomers. In other cases, the molecule may have at least 10 monomers, 50 monomers, 100 monomers, at least 1000 monomers, at least 10,000 monomers, at least 100,000 monomers, or at least 1,000,000 monomers. The polymer may also have any molecular weight, for example, at least about 100 daltons. In other embodiments, the polymer may have a molecular weight of at least about 1000 daltons, at least about 10,000 daltons, at least about 100,000 daltons, or at least about 1,000,000 daltons. In some cases, the size of the molecule may approach nanoscopic dimensions. For example, a single polymer molecule can have a mean diameter of at least about 5 nm, corresponding to a very high molecular weight. In other cases, the diameter of the polymer molecule may be at least about 10 nm, at least about 20 nm, at least about 50 nm, at least about 100 nm, or at least about 1 μm.

The backbone of the polymer may be terminated by the same or different moieties. The terminating moieties can be monomers similar in structure to the monomers comprising the backbone chain, or the terminating moieties can be different entities. For example, in some embodiments, the terminating moiety of the backbone comprises a poly(ethylene) oxide chain. The poly(ethylene) oxide chain may have any number of repeat units, for example, about 5, about 10, about 50, about 70, about 90, about 110, about 130 or about 150 repeat units. In addition, the poly(ethylene) oxide chain may end in any chemical group, such as, for example, a methoxy group or a benzoic acid moiety. In certain embodiments of the invention, two poly(ethylene) oxide segments may be joined together in an ether linkage, joining two polymer molecules.

The polymers may have any size distribution. For example, the polymers may have a very tight distribution, where most of the polymers have a single size or a very small range of sizes. The size distribution of the polymers can also be very broad in some cases. The particles that the polymers are in may have polymer molecules of the same molecular weight or different molecular weights. The size of the particle also may not be directly related to the size of the polymer molecule forming the particle.

The polymer may also contain a luminescent moiety, such as a bioluminescent or a chemiluminescent moiety, or the polymer may have a π-orbital structure that gives the polymer its luminescent characteristics. In certain embodiments of the invention, the polymer may be a luminescent polymer amphiphile (attracted to both organic and aqueous environments), or it may posses a luminous poly(phenylene ethynylene) polymer backbone. The polymer may be hydrophobic or soluble in organic solvents, such as toluene, tetrahydrofuran, chloroform, dimethylformamide or methylene chloride. In certain embodiments, the polymer possesses anionic sulfonate pendent groups attached to the backbone or to each other, allowing the polymer to be hydrophilic or soluble in polar solvents, such as water or alcohols, for example, isopropanol, ethanol, or methanol.

The luminescence of polymer molecules of the invention can be modified or controlled by adding certain substituents to the polymer. For example, the luminescence or emission wavelength of photons emitted by a poly(phenylene ethynylene) particle may be controlled or altered through chemical substitution along the poly(phenylene ethynylene) polymer backbone, or along side chains attached to the backbone. The substituents may have any distribution within the molecule, for example, as previously discussed in reference to FIG. 21. The ratio of the substituent to the remainder of the molecule can be any ratio. In some embodiments, the substituents have a delocalized π-orbital structure, or the substituents alter the energy or frequency of emission from excitons that propagate along the polymer. In other embodiments, the substituents induce π-orbital delocalization within the molecule.

Figure 5:
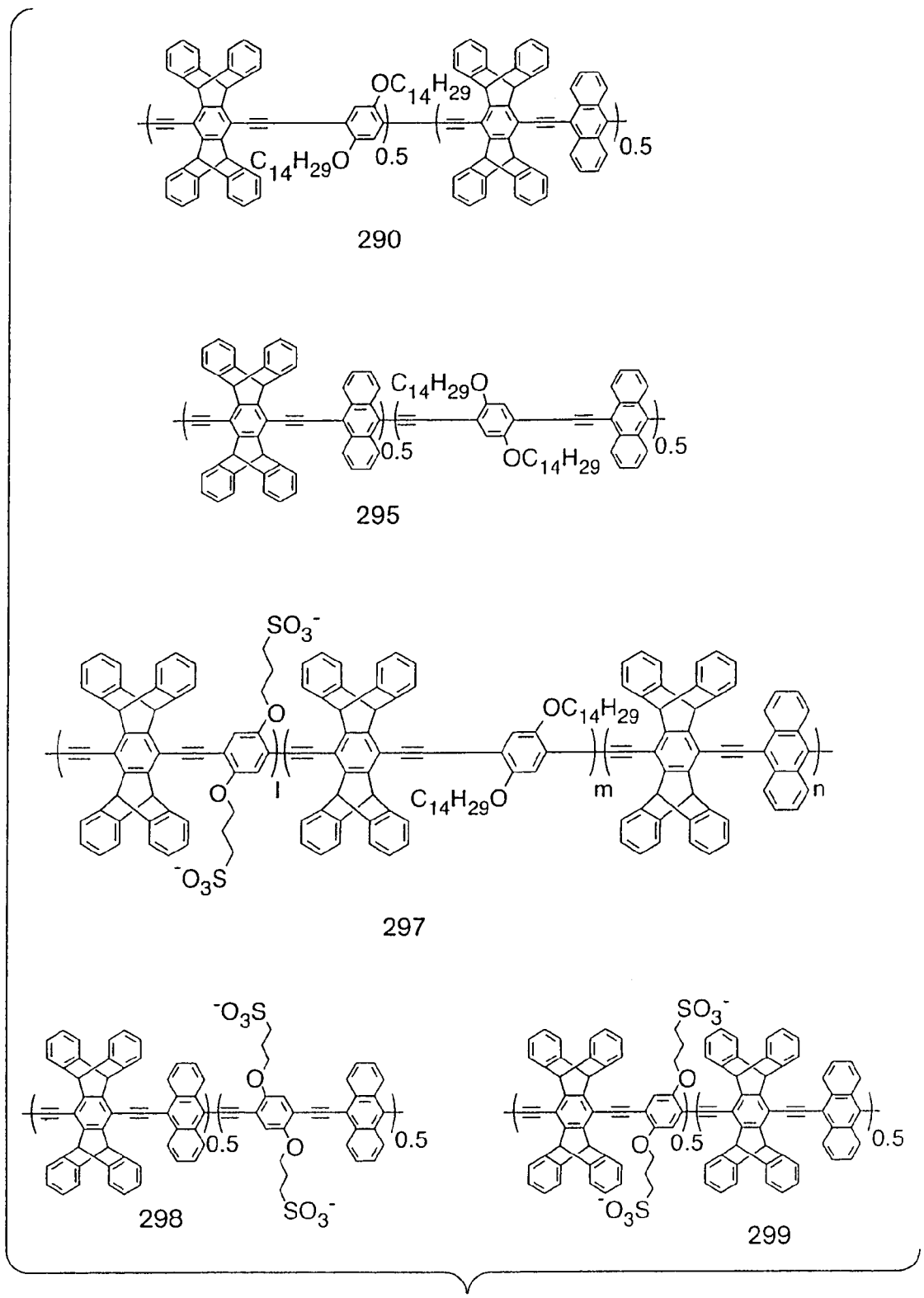
FIG. 5 illustrates various molecules of the invention, incorporating anthracene units.

In some embodiments, the additional substituent is a benzene ring, such as in an anthracene moiety. For example, the substituent can be an anthracene unit joined to the polymer backbone through a 9,10 linkage, where the substituent is one of a number of repeat units of the polymer. Examples of various polymers of the invention that incorporate anthracene moieties are illustrated in FIG. 5.

In certain embodiments of the invention, various side chains are attached to the polymer backbone. The side chains may be uncharged or they may include a charged moiety, which can, for example, help dissolve, suspend, or disperse the molecule within a fluid or other media. The side chains can be attached anywhere in the molecule, for example, along the backbone of the molecule, or attached to one of the bulky groups. The side chain may comprise carbon atoms, forming an aliphatic chain, or the chain may be interspersed with oxygen atoms, for example, as in an ether chain.

In side chains containing charged moieties, more than one charged moiety can be present on each side chain. The charged moieties can have any distribution within the molecule, and have any charge. In addition, the charged moiety may be altered by changing the environment in which the molecule is located, for example, by changing the pH, ion concentration, or temperature of the surrounding media. The charged group may be any charged group, such as a sulfate, a phosphate, or an amine group such as a quaternary amine.

The polymers of the invention may be formed by any suitable technique. For example, various monomer units may be combined together to form the polymer. These may include, for example, iptycyene complexes, poly(ethylene oxide)s, tetrasubstituted benzenes, or disubstituted benzenes. Monomer units having delocalized π-electron configurations can also be included, such as those including double bonds, triple bonds, aromatic groups, pyridines, carbazoles, anthracenes, and the like. Various moieties located on the monomers may be used during polymer synthesis, for example, halogens or acetylides.

The monomer units may be reacted to produce the polymers of the invention by any suitable technique. For example, various monomers can be reacted together over a palladium catalytic complex to produce a polymer. In other embodiments, the polymer is produced by a ring-opening synthesis technique, such as in a ROMP (Ring Opening Metathesis Polymerization) reaction. In still other embodiments, a hydroquinone is reacted to produce a dialkoxy dihalogenated benzene ring for use as a monomer in a polymerization reaction. The dialkoxy group may include a charged entity, such as a sulfate group.

The polymers of the invention are formed into particles using any suitable technique, for example, spray-drying or nebulization. In one set of embodiments, the particles are formed using phase inversion techniques, for example, by using temperature changes or solvent inversion. In temperature phase inversion, the temperature of the solution containing the polymers may be increased or decreased. The change in temperature forces the polymers to form an aggregated state as a dispersed particle. As used herein, "dispersion," "dispersed particles" and similar terms are given their ordinary meaning as understood in chemistry, where the dispersion consists of particles in a medium, in which the particles and the materials forming the particles (e.g., a polymer) are generally insoluble in the medium, but typically are unable to precipitate out of the medium due to their size or other particle/particle interactions that prevent coalescence. The medium containing the particles may be any medium, for example, a fluid, such as water or an organic solvent; a gel, such as a hydrogel; a polymer, for example, polystyrene or an optically clear polymer; or a glass, for example, $SiO_2$ or other formulations having irregular molecular structures.

Figure 22:
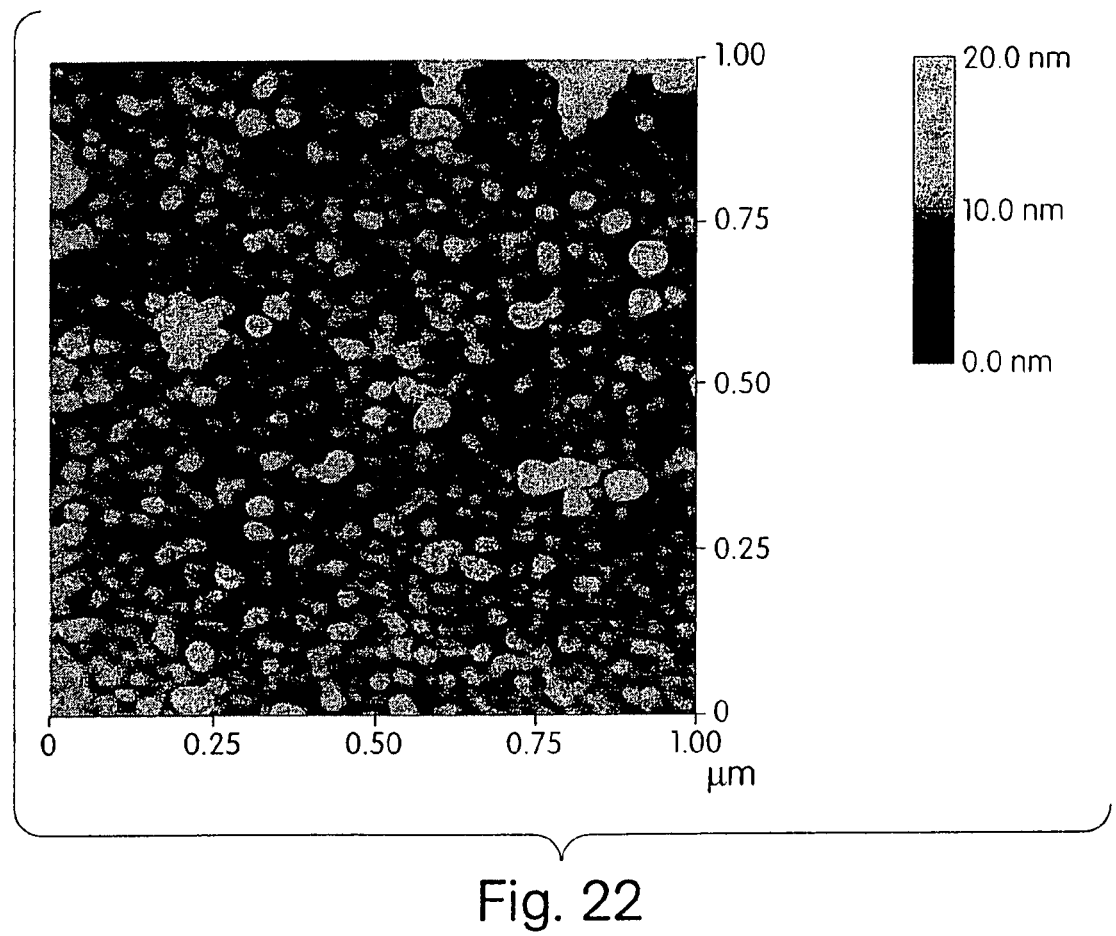
FIG. 22 is an atomic force micrograph illustrating particles of the invention.

In solvent inversion, a solvent containing dissolved polymer is diluted with a second solvent of the opposite phase, for example, diluting an organic solution containing dissolved polymer with water to form a dispersion containing polymer particles. A sample atomic force microscopy image of particles produced using phase inversion technique is shown in FIG. 22. The polymer may be soluble in one solvent, but is insoluble in the opposite solvent. Examples of typical organic solvents include dimethylformamide, tetrahydrofuran. The aqueous solution may be water, or it may be water containing other ions or molecules, for example, as in a salt solution such as saline or potassium chloride solution. The addition of a solvent of the opposite phase to the solvent containing the polymer may not cause the polymer to precipitate out of solution under certain circumstances. Instead, the polymer forms a stable dispersed composition within the solvent of the opposite phase.

The particles may remain dispersed within the solvent for extended periods of time, for example, at least one minute, preferably at least one hour, more preferably at least one day, more preferably at least one week, more preferably at least one month, more preferably at least two months, and still more preferably, at least three months or even longer. The stability of the dispersion can be established by any suitable method, such as by examination of the solvent over periodic time intervals to determine if precipitation occurs, for example, by such methods as size selective filtration, light scattering particle size analysis, light microscopy, electron microscopy, atomic force microscopy, gel permeation chromatography, gel electrophoresis, or viscometric analysis. The particles remain dispersed in solution, for example, due to charged groups located within the polymers within each particle, such as on side chains attached to the backbone chain of the polymer, or along the backbone chain itself. In other cases, the charged groups are not integral to the polymer molecule, but are separately attached to the particle; for example, in the case of a silica particle having embedded polymer, the charge groups may be covalently bound to silica but not the polymer.

In some embodiments, the individual polymer molecules may also be prevented from aggregating with each other, or interacting with each other through π-orbital overlap, for example, by the distribution of charges within each polymer, by the presence of bulky substituents within each polymer, or due to the physical properties of the particles containing the individual polymer molecules. In some embodiments, therefore, the dispersion can consist of single, isolated polymer molecules in solution. If the polymers have a sufficiently high molecular weight, the dispersion can consist of nanometer-sized isolated polymer molecules dispersed within the solvent. In other embodiments, the dispersion may consist of particles containing embedded polymer molecules that are unable to significantly react with each other, such as in a silica particle, a latex bead, or the like. In some cases, the particles may also include additional functionalities. For example, the particle may be coated with another material, or the particle may have a surface that is chemically altered in some fashion, for example, to provide chemical functional groups suitable for binding compounds. Techniques for doing so are well known to those of ordinary skill in the art.

In certain embodiments of the invention, particles of a certain size may be energetically favorable, for example, due to a balance between charge-charge repulsion and aggregation tendencies of the molecules. Thus, in some embodiments, the particle dispersion has a uniform size distribution. However, it is to be noted that particles having a uniform size distribution may not necessarily all have the same molecular weight polymer molecules. Different particles having the same physical size may have different numbers of polymer molecules contained therein.

The particles of the invention may have a diameter of less than about 5 nm, less than about 10 nm, less than about 100 nm, less than about 1 μm, less than about 10 μm, or less than about 100 μm. Particles having a diameter greater than about 1 nm and less than about 1 μm are usually referred to as nanoparticles; particles with diameters of greater than about 1 μm and less than about 1 mm are usually referred to as microparticles. Particle sizes can be determined by any suitable technique, for example, size selective filtration, light microscopy, electron microscopy, gel permeation chromatography, gel electrophoresis, atomic force microscopy or laser light scattering methods. Particles that are microparticles or nanoparticles can define embodiments of the invention. The particles of the invention may also include other materials besides the polymers discussed above. For example, the particles can include additional, non-luminescent polymer compounds; buffers, ions, or salts; or semiconductor materials such as silica.

The nanoparticles formed typically remain luminous after formation. For example, the quantum yield of a luminescent particle may be at least about 0.2 times the quantum yield of the polymer when dissolved in solution and not in particulate form. The quantum yield of a molecule may be defined as the ratio of the amount or number of photons emitted, compared to the amount or number of incident photons. Preferably, the quantum yield of the particle may be at least about 0.25 times the quantum yield in solution; more preferably, the quantum yield of the particle may be at least about 0.3 times the quantum yield in solution; still more preferably, the quantum yield of the particle may be at least about 0.35 times the quantum yield in solution; still more preferably, the quantum yield of the particle may be at least about 0.4 times the quantum yield in solution; and still more preferably, the quantum yield of the particle may be at least about 0.5 times the quantum yield in solution. In certain embodiments, the quantum yield of the particle may be at least about 0.10; in some cases, at least about 0.15; in other cases, at least about 0.20; and in other cases, at least about 0.25. Typically, a high degree of luminosity is preferred. The luminosity of the particles can be determined by any suitable technique for determining luminosity known to those of ordinary skill in the art, for example, by fluorescence or absorption spectroscopy.

The particles may also have a high surface-to-volume ratio. The surface area of the particle is formed from the surface area of the polymer molecules comprising the particle, and hence may not be directly related to the diameter of the particle. In some embodiments, the high surface-to-volume ratio may give the particles higher sensitivities, as a larger surface area is exposed to free solution.

The particles of this invention may have the ability to be rapidly quenched in solution by a quenching molecule. Quenching agents may include, for example, N-methyl dinitrobenzene morpholine and similar compounds. In certain embodiments, the quenching molecule can quench the luminosity of the particle with a Stern-Volmer constant of at least $10^6$ M$^{-1}$, preferably at least about $10^7$ M$^{-1}$, and still more preferably about $10^8$ M$^{-1}$. The magnitude of the Stern-Volmer constant and hence sensitivity varies as a function of solvent composition. The quenching agent may have its greatest quenching ability, as measured by the Stern-Volmer constant, at a specific ratio between the organic solvent and the aqueous solvent.

The use of quenching agents able to quench the luminescence of the polymers at high quenching rates may allow the particles to have sensitive detection abilities. For example, an analyte molecule, upon binding to a binding site connected to a quenching agent, may cause the quenching agent to be released from the luminescent polymer. The luminescent polymer, upon release of the quenching agent, becomes highly luminescent, and this change can be easily detected. Alternatively, an analyte, upon binding to a binding site, may cause a quenching agent to be released or exposed. The quenching agent may then bind to a luminescent polymer. The binding of the quenching agent to the luminescent polymer causes the luminescent polymer to lose its luminescence, which is then detected.

As the specificity between the quenching agent and the polymer may be high, as measured by the Stern-Volmer constant, in some cases, a small number of binding events of an analyte to a binding site leads to large changes in the luminosity of the particles. For example, polymers containing conjugated π-backbone systems with multiple binding sites may have a high degree of sensitivity, as one binding event to one binding site may alter the π-backbone electron configuration or energy level, affecting the luminescence of the particle containing the polymer. Thus, in certain embodiments of the invention, the binding of less than 25 molecules, preferably less than 10 molecules, more preferably less than 7 molecules, more preferably still less than 5 molecules, and most preferably only 1 molecule, upon binding of the molecule or molecules to the binding site, causes a detectable change in the luminosity of the particle that contains the binding site. Thus, in certain embodiments of the invention, a luminescent particle may be used to detect a single analyte molecule in solution, for example, a biological, biochemical or chemical molecule.

The binding site may comprise a biological, biochemical or chemical molecule able to bind to another biological, biochemical or chemical molecule in solution (the "analyte"). For example, the binding site may include a chemical receptor able to bind to a molecule such as trinitrotoluene (TNT), such as may be present within a land mine. In some cases, less than about 1 pg/g, preferably less than about 100 fg/g, more preferably less than about 10 fg/g, and still more preferably, less than about 1 fg/g may be detected in certain particles of the invention.

As another example, the binding site may include a molecule able to bind to a biological analyte. For example, the binding site may be a receptor protein, a nucleic acid, an enzyme, or an antibody; the analyte may be any biological agent, such as a virus, a bacteria, a toxin, a hormone, a nucleic acid, a protein, a carbohydrate, or the like. These agents also include trace biological compounds, for example, that might be present within spoiled food. For example, a luminescent nanoparticle, having one or more nucleic acid molecules attached thereon, may be useful as a fluorescent tag for a FISH assay (fluorescence in situ hybridization). As another example, if an antibody is attached to the luminescent particle, then the particle may be used in fluorescent antibody staining in some cases. As yet another example, if a nucleic acid is bound to the luminescent nanoparticle, then the nanoparticle may be used for nucleic acid detection.

The function and advantages of these and other embodiments of the present invention will be more fully understood from the following examples. These examples are intended to be illustrative in nature and are not considered to be limiting the scope of the invention.

EXAMPLE 1

Synthesis of Nanoparticles

This example illustrates one method of producing luminescent polymeric nanoparticles. A schematic diagram of this process can be seen in FIGS. 1 and 2.

Anionic poly(phenylene ethynylene)s were prepared by copolymerzing sulfonated monomer 210, glycol monomer 220, and pentiptycene 230. The synthesis of sulfonated monomer 210 is described further below. The synthesis of glycol monomer 220 and pentiptycene monomer 230 has been previously reported, for example, in Yang, et al., *J. Am. Chem. Soc.*, 120:11864 (1998).

Sulfonated monomer 210 was prepared according to the scheme shown in FIG. 1. Benzene derivative 205 was prepared from hydroquinone 200, then further reacted to produce sulfonated monomer 210. Benzene derivative 205 was prepared as follows. NaH (60% in oil; 9.9 g, 0.248 mole) was placed in a clean, oven-dried, 3-neck round bottom flask. The flask was sealed and purged with argon. 25 ml of tetrahydrofaran was added to the NaH dispersion and then decanted off via syringe to extract the dispersion oil. 50 ml of anhydrous tetrahydrofuran was added to disperse the NaH. Hydroquinone 200 (13.36 g, 0.121 mole) was placed in a clean oven-dried flask and dissolved in 50 ml of anhydrous tetrahydrofuran. The hydroquinone solution was added slowly to the NaH dispersion over 1 hour. Vigorous gas evolution and the formation of a white gelatinous precipitate were observed.

An additional 100 ml of anhydrous tetrahydrofuran was added to form a free-flowing white slurry, and this was stirred for an additional hour. Propanesultone 203 (22.4 ml, 0.255 mole) was added slowly via syringe and the mixture stirred for 1 hour. The mixture was quenched cautiously with water until gas evolution ceased and then the reaction volume was doubled with water. Initially, a white precipitate formed, which dissolved on dilution and stirring. The mixture was acidified with concentrated HCl yielding a clear light brown solution.

The product was recovered by precipitation in 1.5 liters of acetone and filtered. The crude product was recovered as a fine, off-white powder (37.4 g, 85% yield) and used without further purification in the subsequent iodination. The product was characterized by nuclear magnetic resonance spectroscopy ("NMR") to be 1,4-(bis-3-sulfopropyloxy)benzene 205.

Benzene derivative 205 (37.4 g, 0.106 mole), $KIO_3$ (9.0 g) and iodine (53.6 g) were charged to a 1 liter, 3-neck round bottom affixed with a reflux condenser. To this, 290 ml acetic acid, 35 ml deionized water and 2 ml concentrated sulphuric acid were added. A stir bar and a magnetic stirrer were used for mixing, and the flask was heated to reflux with a mantle for 6 hours. After the mixture was allowed to cool to room temperature, residual iodine was consumed by addition of 20% sodium hydrosulfite. A fine silt-like precipitate was collected by filtration, and recrystallized twice from deionized water to yield large needle-like crystals (16 g, 20% yield).

The crystals (1.0 g) and LiOH (0.075 g) were heated in approximately 15 ml deionized water until both dissolved. On cooling, fine white needle-like crystals formed. These crystals were collected by filtration and dried under vacuum. NMR analysis of the crystals indicated that sulfonated monomer 210 was formed in this reaction.

Sulfonated monomers 210 (14.8 mg, $2.40 \times 10^{-5}$ mole), glycol monomer 220 (15 mg, $2.40 \times 10^{-5}$ mole) and pentiptyene monomer 230 (22.9 mg, $4.79 \times 10^{-5}$ mole) were charged to a Schlenk reaction tube equipped with a magnetic stir bar. The reaction tube was transferred into an inert atmosphere glove box, where $Pd(P(C_6H_5)_3)_4$ (5.5 mg) and CuI (5.5 mg) were added, then the tube sealed. 3 ml of argon-sparged, 2:3 (v:v) diisopropylamine:dimethylformamide was added via cannula. The reaction mixture was heated at 65° C. with stirring for 20 hours.

At the end of the polymerization, the copolymer was recovered by precipitation in ~150 ml of acetone. The yellow/green, fluffy solid was collected by filtration and dried under vacuum. On drying, the solid turned dark green.

Molecular weight was determined by gel permeation chromatography ("GPC") using 0.1 M LiBr dimethylformamide as the eluent and monodisperse poly(methyl methacrylate) standards. The number-averaged molecular weight of the polymer was approximately 17,000; the weight-averaged molecular weight of the polymer was approximately 123,000. Analysis of the solid revealed it to be anionic poly(phenylene ethynylene) 240.

0.01 mg anionic poly(phenylene ethynylene) 240 was dissolved in 5 ml dimethylformamide, then added to 50 ml of deionized water. The pH of the final solution was adjusted to 6.8. No precipitation of the solution was observed.

Evidence of particle formation comes from absorbance and fluorescence spectroscopic studies and from atomic force microscopy. Glass slides coated with poly(dimethyldiallylammonium chloride) were used to adsorb the polymer. Atomic force microscopy images of the glass slides after exposure to the dispersion revealed a nodular surface whose features were approximately 7±2 mm in height. Absorbance spectroscopy of the diluted water dispersion showed features more reminiscent of a spin-cast film than of a dimethylformamide solution. These results indicate that the dilution of a dimethylformamide solution of anionic poly(phenylene ethynylene) 240 yields dispersed particles having the spectroscopic signature of a solid.

Thus, this example illustrates one method of producing the luminescent polymeric nanoparticles of the present invention.

EXAMPLE 2

Synthetic Pathway of Nonionic Poly(phenylene ethynylene)s

Figure 3:
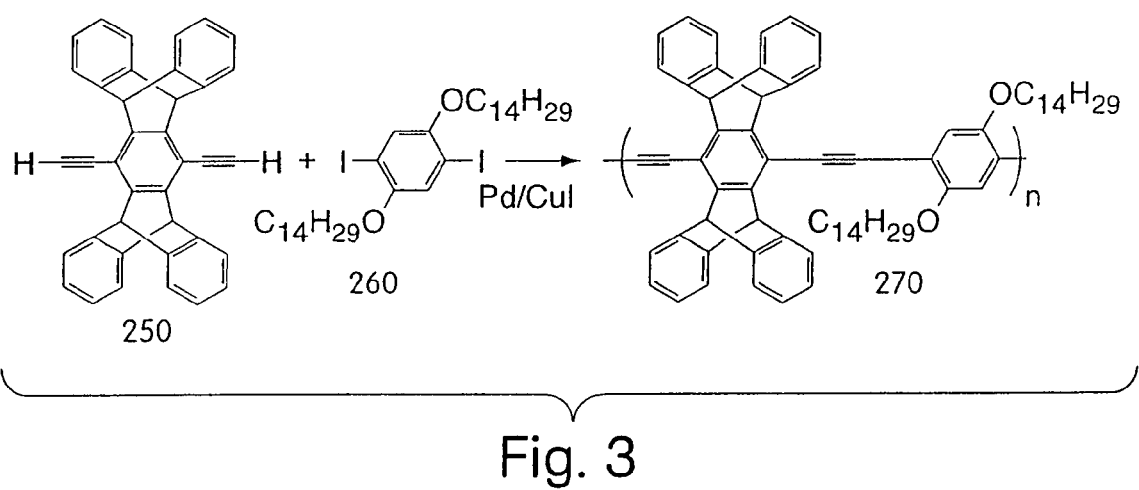
FIG. 3 is a schematic of a polymerization mechanism of an embodiment of the invention.

This example illustrates a method of producing nonionic poly(phenylene ethynylene) particles. A schematic diagram of this process is illustrated in FIG. 3.

Bis-acetylenic pentiptycenyl monomer 250 and diiodoaryl monomer 260 were polymerized over a palladium/copper iodide catalyst to produce pentiptycene phenylene ethynylene polymer 270. Because these polymers are condensation polymers, the copolymer composition can be systematically varied as needed through simple copolymerization schemes similar to the one described here. The preparation of the particles dispersed in water, starting from pentiptycene phenylene ethynylene polymer 270, was similar to the procedure described in Example 1.

This example therefore illustrates reaction pathways which can be used to produce nonionic polymer particles of the invention.

EXAMPLE 3

Synthesis of Anionic Poly(phenylene ethynylene anthracene)s

This prophetic example illustrates a method for producing modified anionic poly(phenylene ethynylene)s for use in particles of the present invention.

Figure 4:
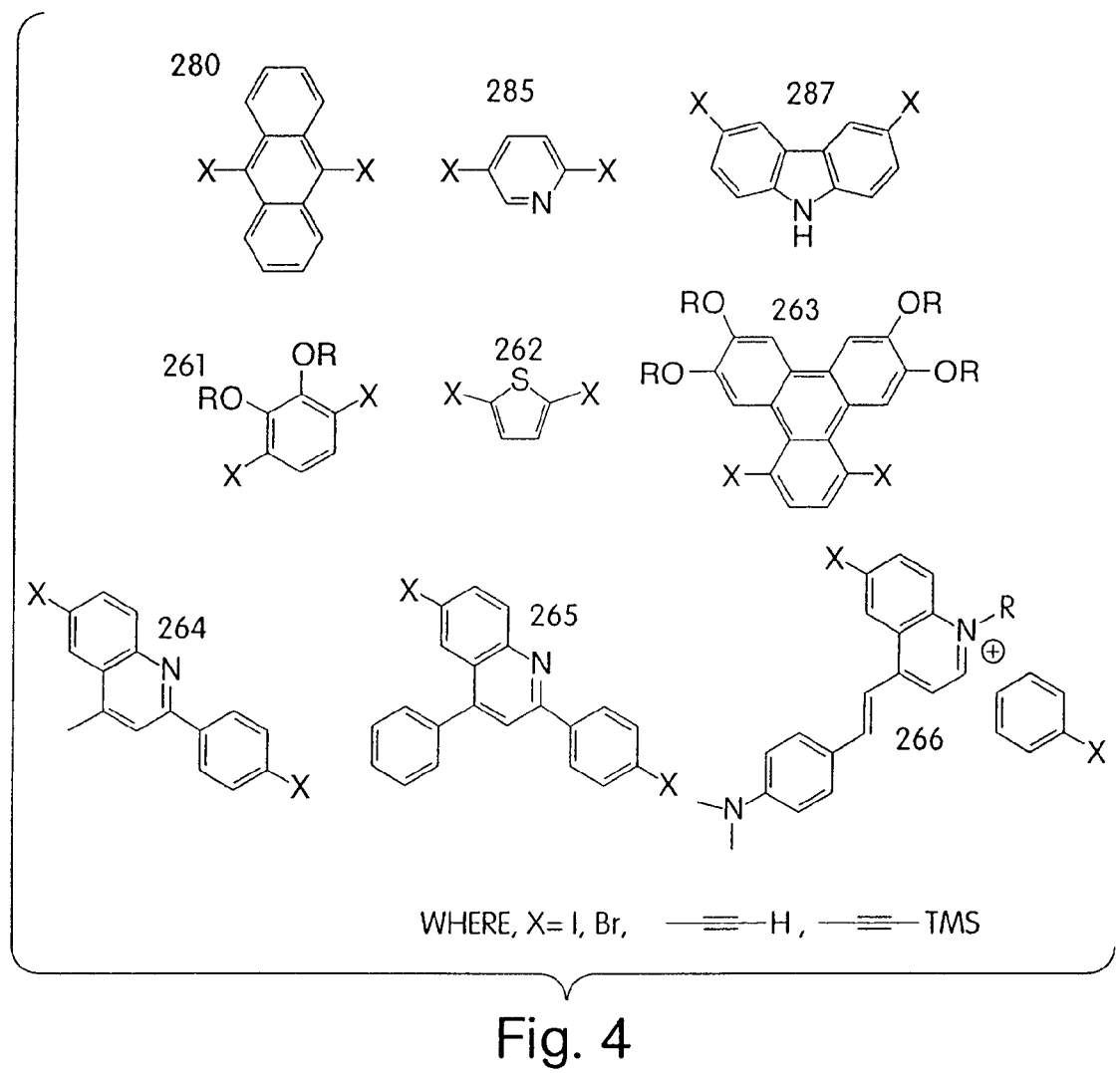
FIG. 4 illustrates various monomers that may be used in certain embodiments of the invention.

The reaction scheme described in Example 1 can be modified by the addition of, for example, 9,10-disubstituted anthracene 280, 2,5-disubstituted pyridine 285, or 3,6-disubstituted carbazole 287, shown in FIG. 4, where X can indicate iodine, bromine, acetylide, or acetylide trimethyl silane ("TMS"). In compounds where more than one X moiety is indicated, the X moieties can be the same or different; for instance, 9,10-disubstituted anthracene structure 280 can represent 9,10-dibromoanthracene or 9-bromo-10-iodoanthracene. Additional compounds that may be incorporated into the reaction scheme are also shown in FIG. 4, for example, compounds 261, 262, 263, 264, 265 and 266. Some of the possible reaction products are shown in FIG. 5. The exact polymers obtained will be a function of the starting materials and the actual reaction conditions. For example, reaction of 9,10-dibromoanthracene (based on structure 280) with bis-acetylenic pentiptycenyl monomer 250 and the diiodoaryl monomer 260 may produce either anionic poly(phenylene ethynylene anthracene) 290 or anionic poly(phenylene ethynylene anthracene) 295, depending on the reaction pathway used. Other polymers that may be generated, starting from 9,10-dibromoanthracene, include anionic poly(phenylene ethynylene anthracene) 297, anionic poly(phenylene ethynylene anthracene) 298, or anionic poly(phenylene ethynylene anthracene) 299. Still other polymers may be generated, for example, by combining several π-delocalized reactants together, for example, to produce a terpolymer or a higher order copolymer. Reactions including, for example, the 2,5-disubstituted pyridine 285, the 3,6-disubstituted carbazole 287, or any other compounds illustrated in FIG. 4 as reagents can be used to produce many different polymer structures for use in the particles of the present invention. The polymer reaction pathways should be chosen, for example, to produce modified anionic poly(phenylene ethynylene)s that are highly luminescent when formed into the particles of the invention.

Thus, this example illustrates methods for producing modified anionic poly(phenylene ethynylene)s, that can be used in the particles of the present invention.

EXAMPLE 4

Stern-Volmer Titration

This example demonstrates that particles of the present invention can be quenched with high Stern-Volmer quenching constants.

Figure 6:
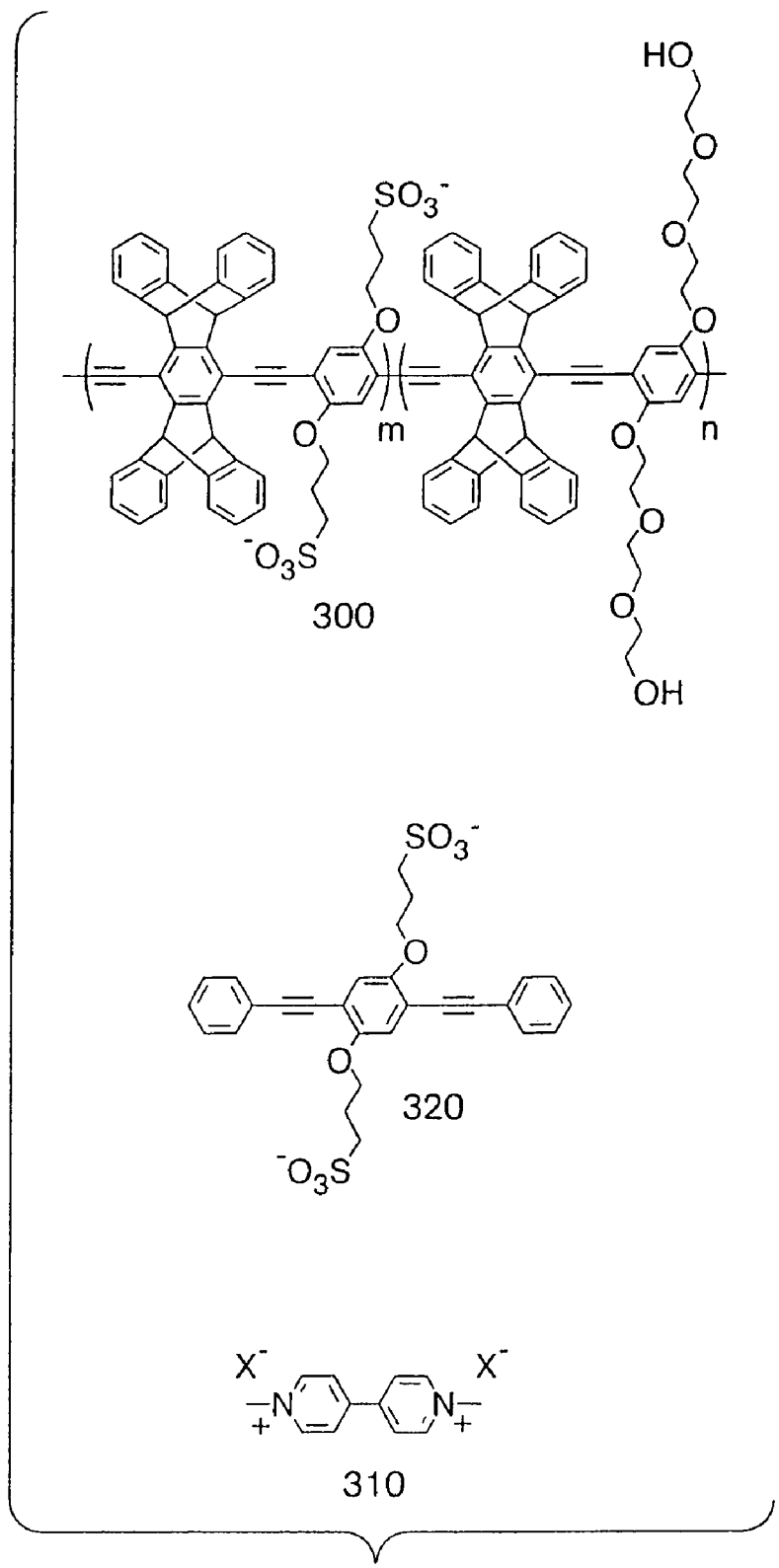
FIG. 6 shows structures and a quenching agent that quenches the structures, in accordance with an embodiment of the invention.

Anionic polyethynylene 300, illustrated in FIG. 6, was quenched using quenching agent 310 in a solution of dimethylformamide ("DMF") and water. As a control, molecule 320, which also has a delocalized π-orbital backbone and anionic side groups, was also quenched using quenching agent 310, in a solution of dimethylformamide and water.

Results from these experiments are shown in Table 1. Quenching of poly(phenylene ethynylene) 300 with quenching agent 310 in water yielded high Stern-Volmer titration constants, greater than $10^6$ M$^{-1}$, and, under some conditions, greater than $10^8$ M$^{-1}$, as seen in Table 1.

TABLE 1

| DMF/H$_2$O | Host [300] (M) | Host [320] (M) | Guest [310] (M) | $K_{s-v}$ (M$^{-1}$) |
|---|---|---|---|---|
| 100/0 | — | $2.5 \times 10^{-6}$ | $1.0 \times 10^{-3}$ | 12,000 |
| 100/0 | $2.5 \times 10^{-6}$ | — | $1.0 \times 10^{-5}$ | 270,000 |
| 10/90 | $2.5 \times 10^{-6}$ | — | $1.0 \times 10^{-5}$ | 1,032,750 |
| 1/99 | $2.5 \times 10^{-6}$ | — | $1.0 \times 10^{-7}$ | 181,660,000 |
| 0/100 | — | $2.5 \times 10^{-6}$ | $1.0 \times 10^{-3}$ | 4,700 |

Figure 7:
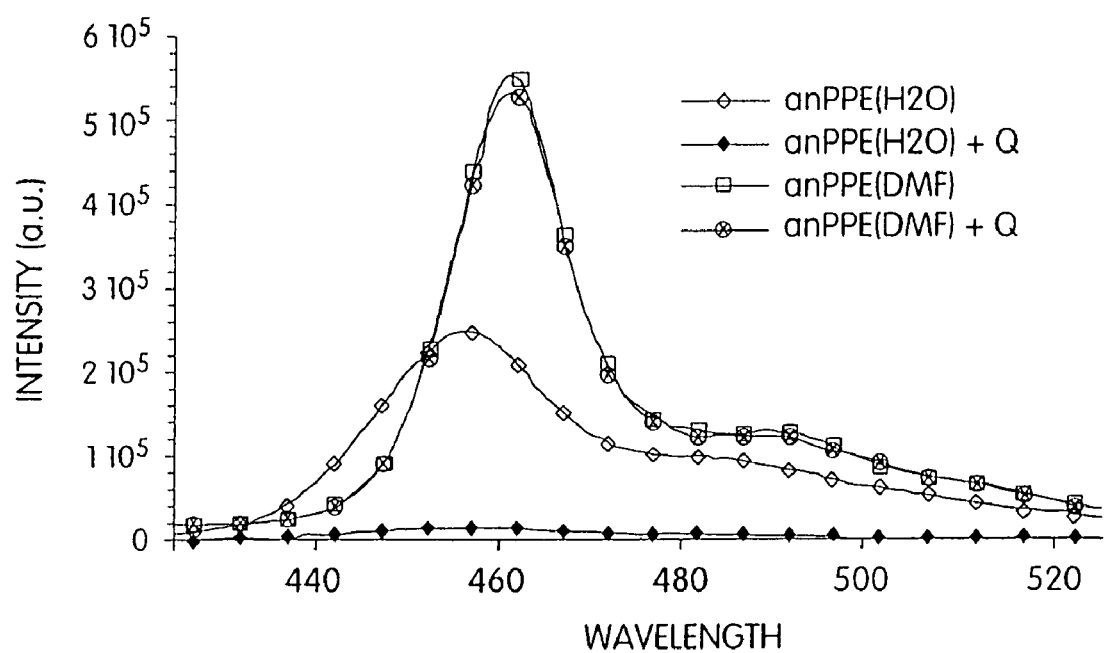
FIG. 7 is a graph illustrating the quenching properties of specific molecules of the invention.

FIG. 7 illustrates how the fluorescence spectra of the anionic poly(phenylene ethynylene)s may be altered upon exposure to a quenching agent. Anionic poly(phenylene ethynylene) 300, when dissolved in dimethylformamide, does not decrease significantly in intensity (approximately 4%) upon exposure to quenching agent 320. The initial fluorescence intensity of anionic poly(phenylene ethynylene) 300 is approximately $5.2 \times 10^5$ (arbitrary units) when dissolved in dimethylformamide, but decreases approximately 50%, to $2.4 \times 10^5$ when in particulate form in water, thus indicating that some self-quenching may be observed as the polymer is aggregated into a particle. However, anionic poly(phenylene ethynylene) 300, when suspended in particulate form in water, significantly decreases in intensity upon exposure to quenching agent 320, from approximately $2.4 \times 10^5$ to near 0. There is also a slight blue-shift in the maximum peak intensity, reflecting a higher energy conformation of the polymer chain when in particulate form.

Thus, this example demonstrates that Stern-Volmer quenching constants greater than $10^6$ M$^{-1}$, and, under some conditions, greater than $10^8$ M$^{-1}$, may be attained using the particles of the present invention.

EXAMPLE 5

Reversible Shifts in Absorbance Spectra

In this example, the absorbance maxima of the particles can be shifted by altering the organic content of the dispersion that the particles are located in.

Figure 8:
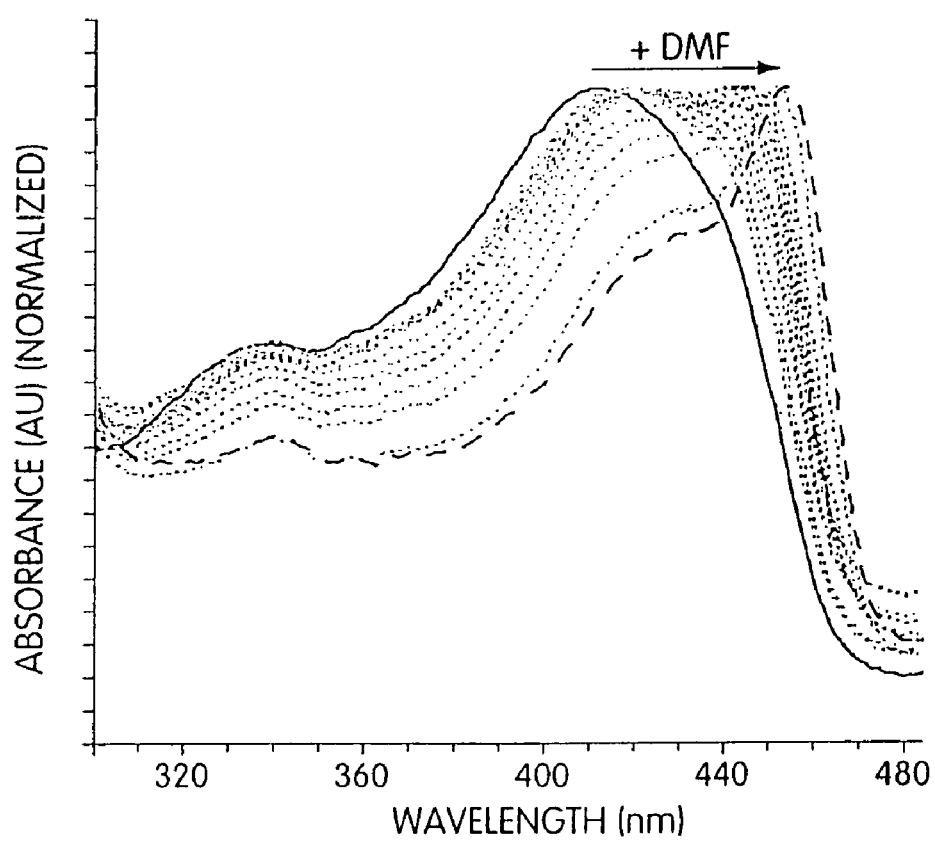
FIG. 8 shows an absorbance spectra of an embodiment of the invention, as the concentration of an organic solvent, dimethylformamide, increases.
Figure 9:
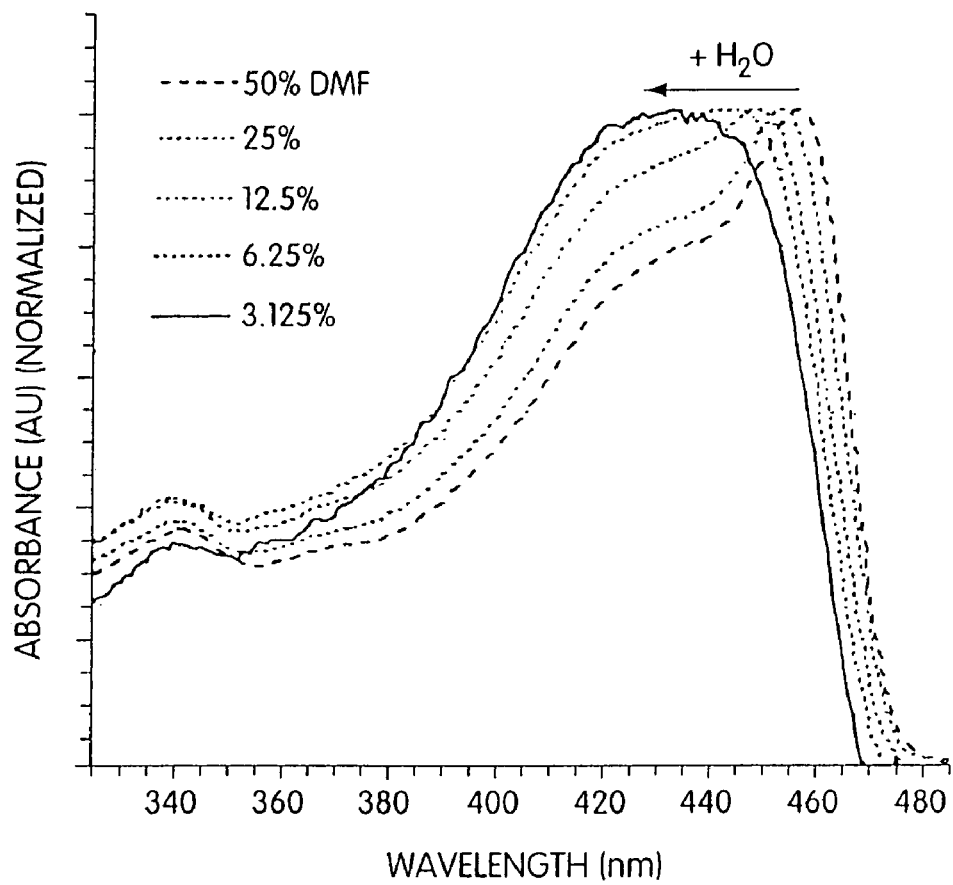
FIG. 9 is a graph of an embodiment of the invention, showing a shift in the absorbance spectra, as the aqueous content of the solution increases.

FIG. 8 shows how the absorbance profile of anionic poly(phenylene ethynylene) 300 shifts as the concentration of dimethylformamide increases. The peak absorbance shifts from a wavelength of about 410 nm to a wavelength of about 460 nm as the concentration increases from 1% to 50% dimethylformamide. In FIG. 9, the reverse process is shown, where the concentration of dimethylformamide decreases and the concentration of water increases. In FIG. 9, the volume of water changes from about 50% to about 97%, corresponding to a change in dimethylformamide concentration from about 50% to about 3%. Thus, FIGS. 8 and 9 demonstrate that the shift in the absorbance spectrum is controllable and reversible.

Thus, this example illustrates that the absorbance spectra of the particles in some embodiments can be altered by controlling the dispersion that the particles are located in.

EXAMPLE 6

Alternate Substituted Diiodobenzenes

This prophetic example illustrates alternate substituted diiodobenzenes that may be used in this invention, as well as methods of making such diiodobenzenes.

Figure 10:
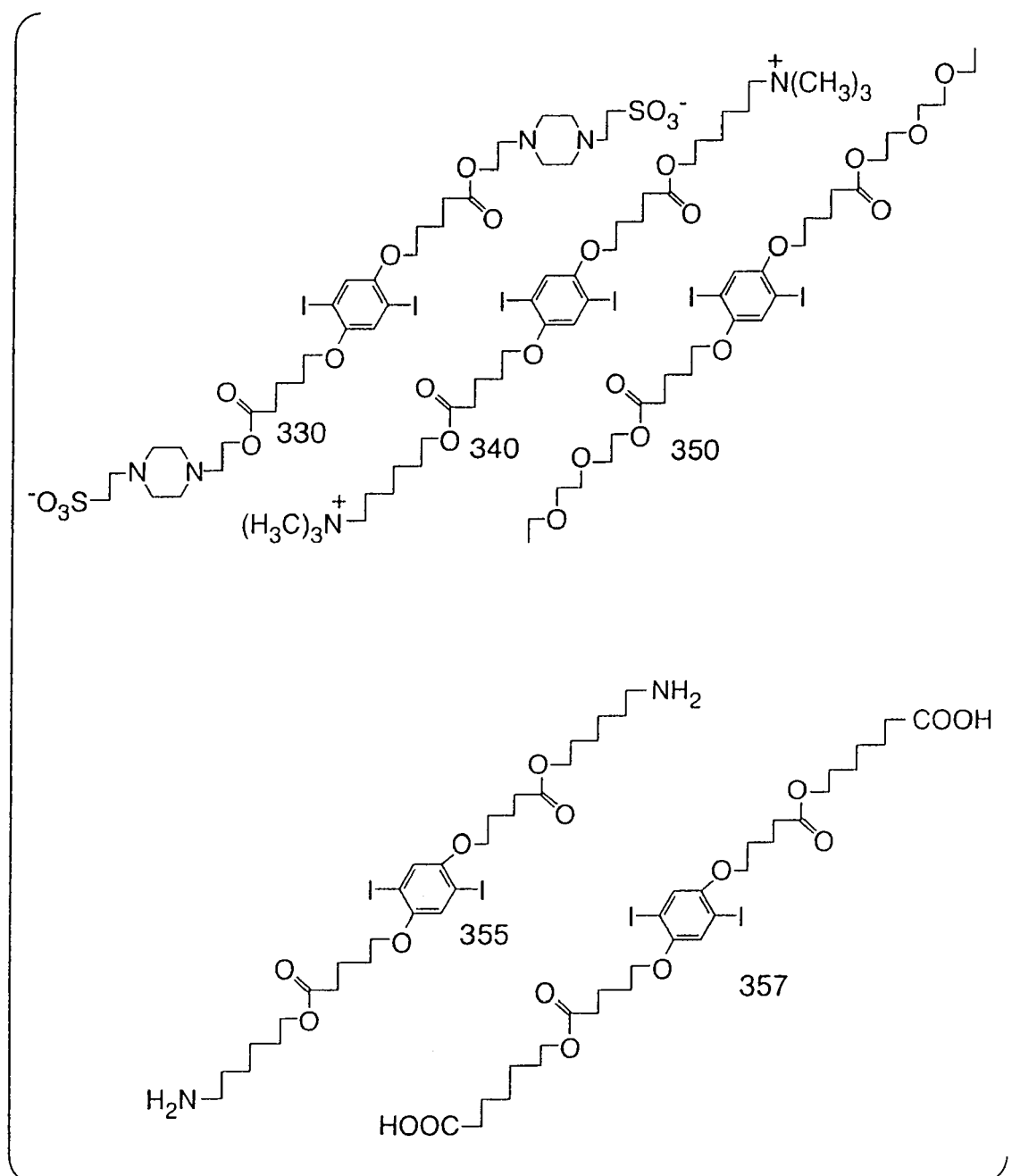
FIG. 10 illustrates various structures that can be incorporated into certain embodiments of the invention.
Figure 11:
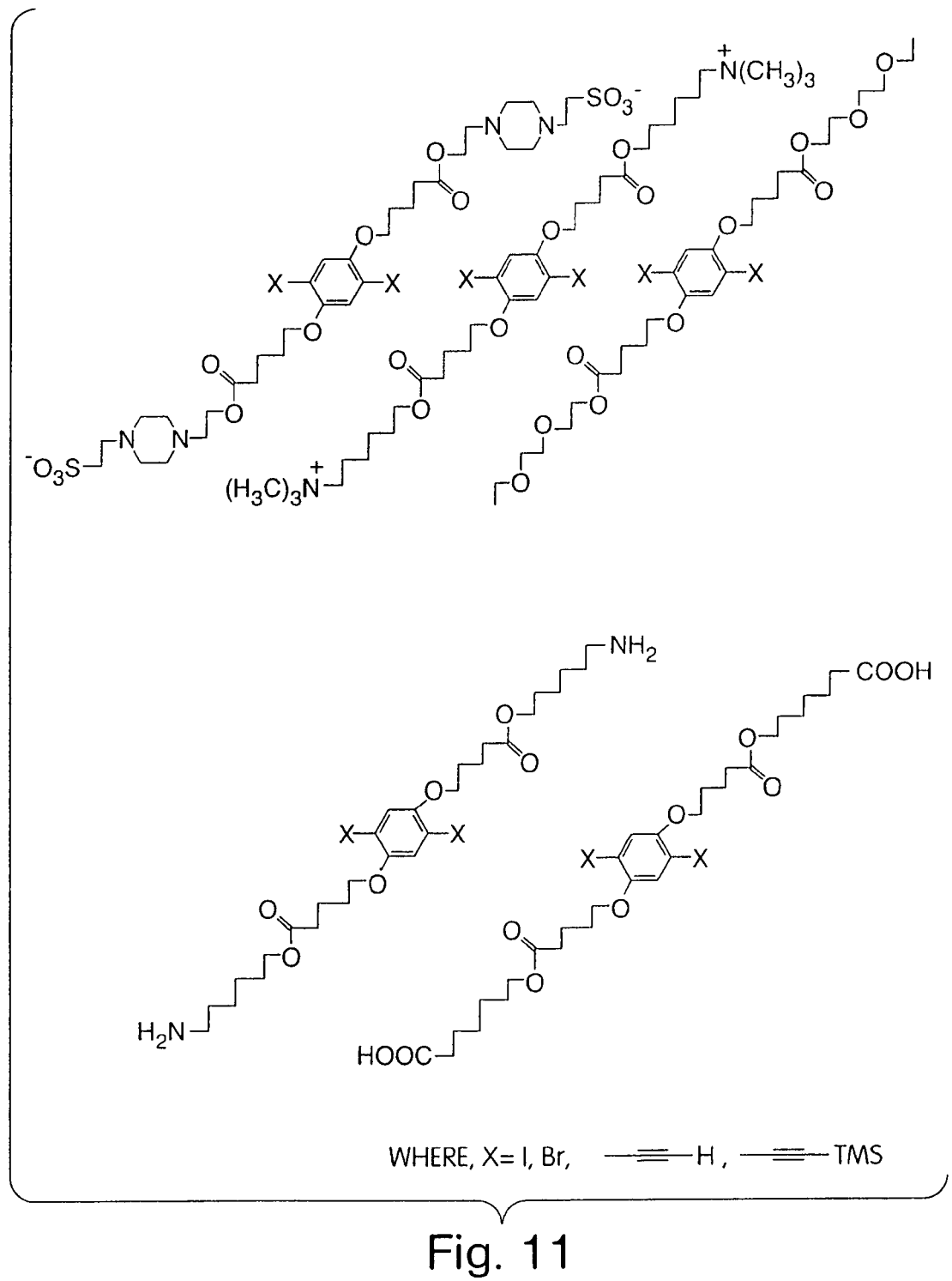
FIG. 11 illustrates additional structures that can be incorporated into certain embodiments of the invention.
Figure 12:
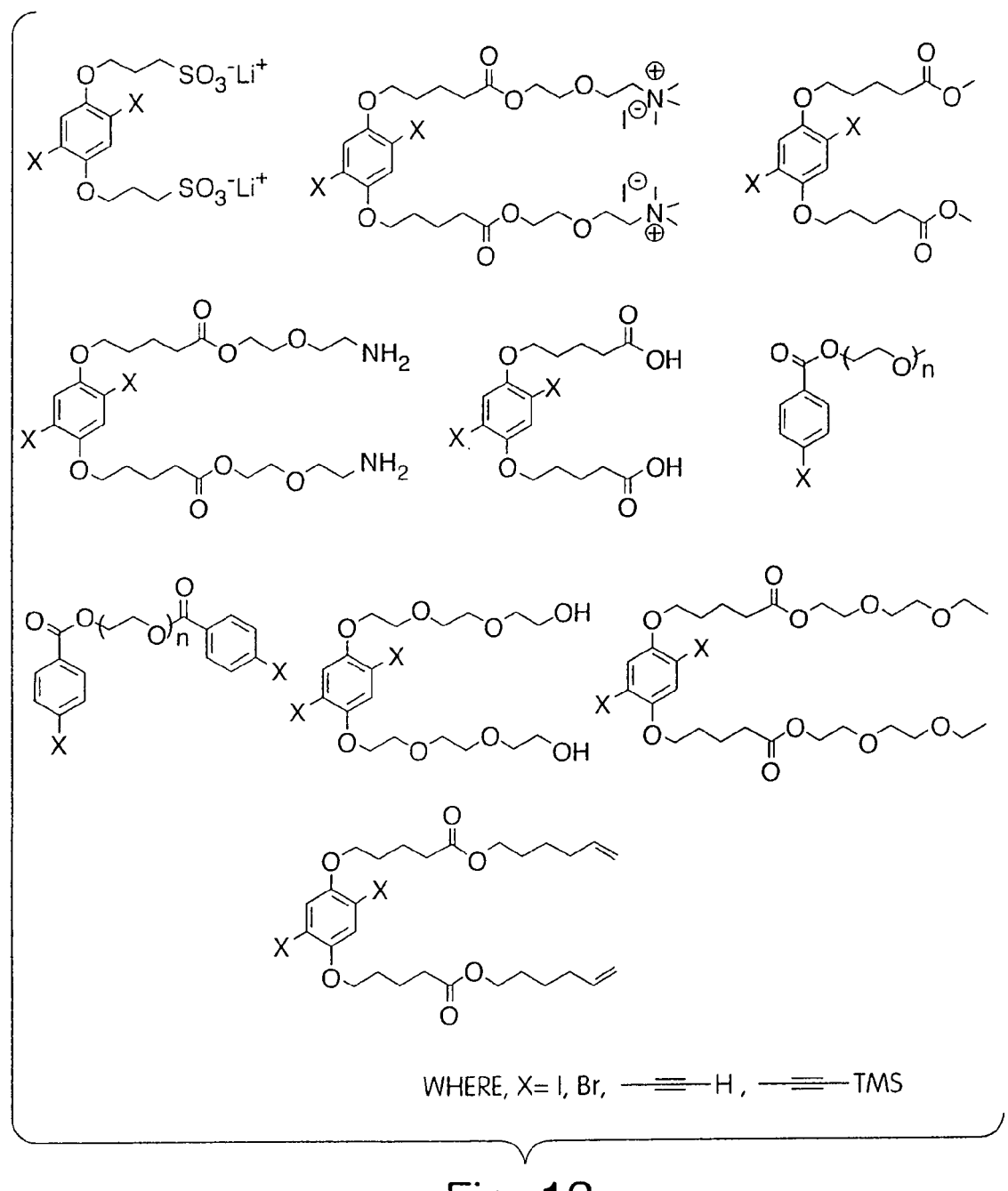
FIG. 12 illustrates additional structures that can be incorporated into certain embodiments of the invention.

The synthesis of 1,4-(bis-3-sulfopropyloxy)-2,5-diiodobenzene 210 (FIG. 1) was previously described in Example 1. Diiodobenzenene 210 may further be reacted through the transesterification of a methyl ester precursor. By altering the operating condition of the methyl ester precursors used, substituted diiodobenzenes 330, 340, or 350 can be produced, as illustrated in FIG. 10. Additional possible substituted diiodobenzenes are illustrated in FIGS. 11 and 12, where X can indicate iodine, bromine, acetylide, or acetylide TMS. In compounds where more than one X moiety is indicated, the X moieties can be the same or different. Synthesis of these compounds proceeds similarly to those described for the iodinated compounds of FIG. 10. The starting compounds should be chosen, for example, to produce polymeric particles that are highly luminescent and have the desired chemical functionalities when formed into the particles of the invention.

For example, substituted diiodobenzenes 330 or 340 in FIG. 10 may be amphoteric (capable of reacting either as an acid or as a base), which can produce interesting pH effects on nanoparticle formation and usage. For example, a shift in the solution pH may cause the particles to lose cohesion and become dissolved in solution or precipitate out of dispersion. A change in the pH may also cause the Stern-Volmer quenching constants of the particles to change, or otherwise affect solution chemistries or binding abilities. Other pH effects are also possible. Reacting 1,4-(bis-sulfopropyloxy)-2,5-diiodobenzene 210 with an amino acid, for example, transesterification of tyrosine, or a methyl ester may also yield various amphoteric materials, which may be suitable for use in biological assays, for example.

The use of uncharged methyl ester may yield non-ionic hydrophilic diiodobenzenes, such as diiodobenzene 350. Diiodobenzene 350 can be polymerized with ionized monomers. Thus, the charge density of the poly(phenylene ethynylene) particle can be systematically controlled in some cases. Other substituted diiodobenzene may also be envisioned, for example, having additional site groups or other chemical properties.

Certain functional groups can be used to conjugate biological, biochemical, or chemical molecules to the particles of the invention. For example, diiodobenzene 355 is terminated by an anime group. This may, for example, allow amino acids or other entities to bind to a polymer that includes subunit 355.

As another example of a terminating function of group on a substituted diiodobenzene, 357 is terminated by a carboxyl group. Other functional groups can be used in the diiodobenzene, and different functional groups can be substituted on either end of the diiodobenzene. For example, one end may be a hydroxy group, while the other end may be a quaternary amine. The carboxyl group may also allow the binding of amino acids or other chemical functionalities to the polymer.

Thus, this example illustrates diiodobenzenenes that can be incorporated within the polymer molecule to provide additional functionalities to the particle dispersion.

EXAMPLE 7

Functionalized Anionic Poly(phenylene ethynylene)s

This prophetic example illustrates how the particles of the present invention may be functionalized for various purposes.

Figure 13:
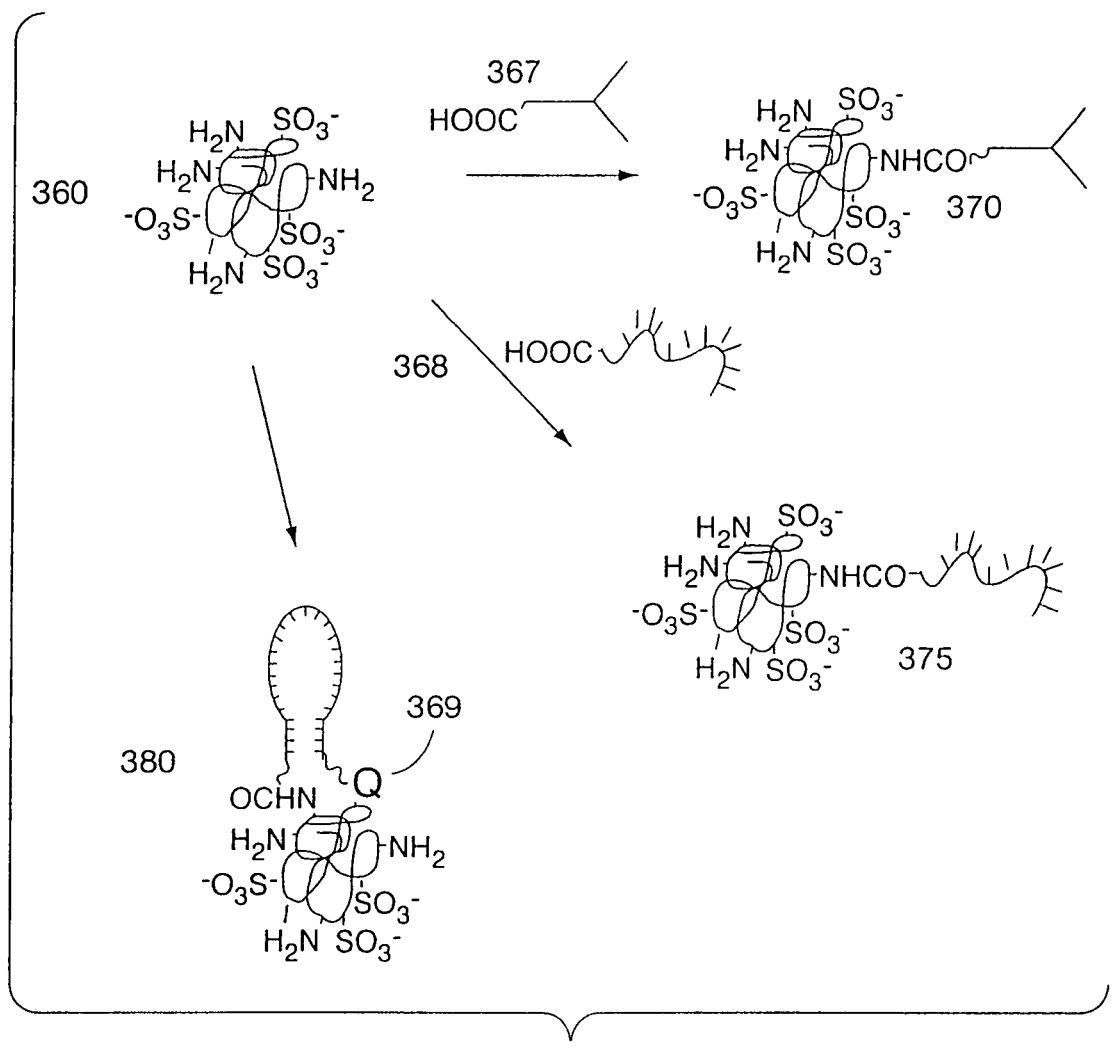
FIG. 13 illustrates how various biological, biochemical, or chemical molecules may be attached to certain embodiments of the invention.

In FIG. 13, a representation of an anionic poly(phenylene ethynylene) particle 360 is shown. Particle 360 can be further reacted with molecules 367, 368, or 369 to yield functionalized anionic poly(phenylene ethynylene) particles.

For example, particle 360 can be reacted with antibody 367, yielding functionalized particle 370. Functionalized particle 370 may be used, for example, in an antibody staining assay, or to bind to a protein or other moiety.

In another embodiment, particle 360 may be bound to carboxyl-terminated nucleic acid 368, yielding functionalized particle 375. Functionalized particle 375, containing a nucleic acid fragment, may be used in assays where the detection of nucleic acids may be desired, for example, in fluorescence in situ hybridization.

As another example, particle 360 is reacted with a stem-loop nucleic acid to produce functionalized particle 380. In addition, quenching agent 369 can be bound to functionalized particle 380. This arrangement can be used, for example, in a nucleic acid detection or quantification assay. Exposure of functionalized particle 380 to the complementary nucleic acid of the stem-loop structure may open up the stem-loop. The opening of the stem-loop releases the quenching agent. This allows the particle containing the polymer to increase its luminosity, as the quenching molecule is released. In another arrangement (not pictured), the binding of a complimentary nucleic acid to a functionalized particle may also cause the binding of a quenching agent, causing the particle to lose some or all of its luminescence; hence, the binding event can be detected by a decrease in luminosity. In some cases, the target nucleic acid or stem-loop structure may also contain other moieties, for example, a fluorphore label or a radioactive tag.

Thus, this example shows how certain functionalized particles of the present invention may be created and used in various assays.

EXAMPLE 8

Stability of Anionic Poly(phenylene ethynylene)s

This example illustrates the stability of a particle containing anionic poly(phenylene ethynylene)s dispersed in water.

Figure 14:
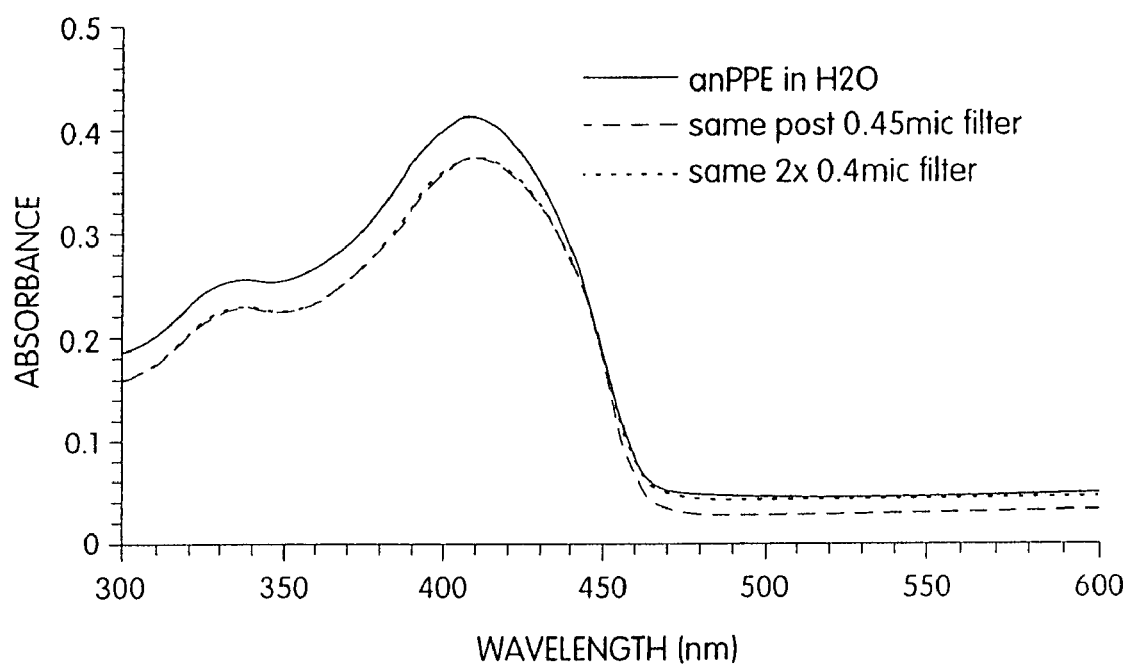
FIG. 14 shows a graph of the absorbance spectra of certain embodiments of the invention, before and after filtration, showing a particulate size of less than 0.45 µm.

An aqueous dispersion of poly(phenylene ethynylene) 300 was prepared and analyzed for its absorbance spectrum, shown in FIG. 14. The dispersion was then filtered twice through a 0.45 μm filter, and the adsorbent spectra of each filtrate was analyzed, also shown in FIG. 14.

The absorbance spectrum of the suspension, before and after filtration, was relatively unchanged. This may indicate that most of the polymer is present in particulate form, with a diameter of less than 0.45 μm.

Figure 15:
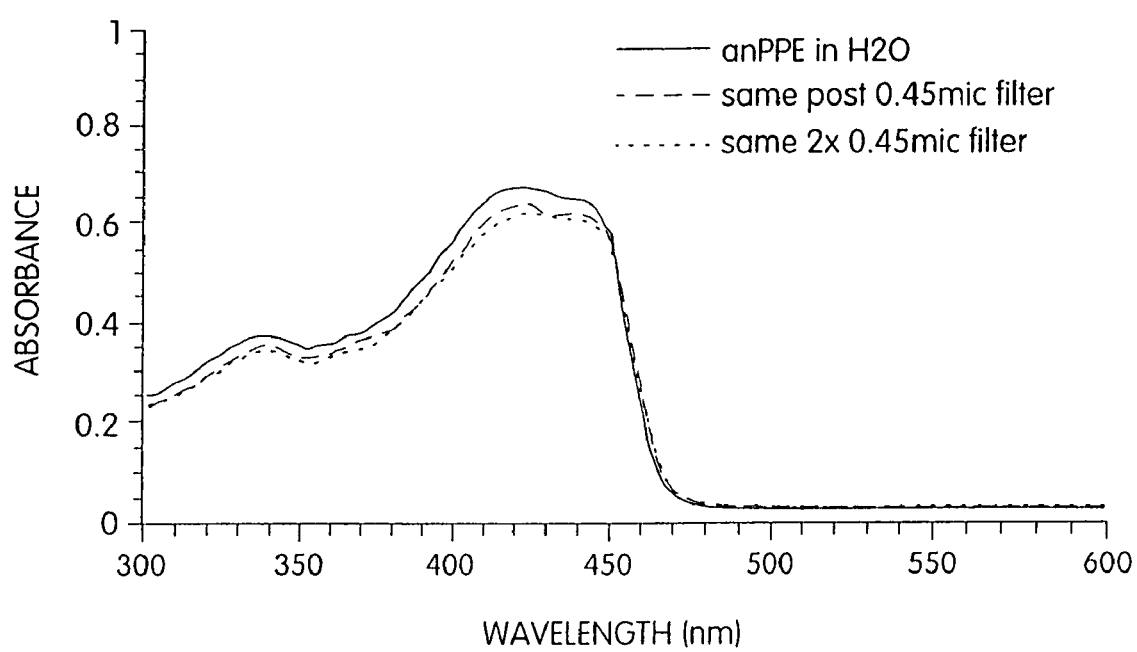
FIG. 15 is a graph of the absorbance spectra of one embodiment of the invention, after filtration and storage for one month, illustrating a particulate size of less than 0.45 µm.

A similar dispersion was prepared and stored for approximately one month. In FIG. 15, the absorption spectra of the dispersion after one month, the same dispersion after being filtered through a 0.45 μm, and the same dispersion after being filtered twice through a 0.45 μm filter are shown. The absorption spectra in all three cases were similar, thus indicating that very little material was lost on filtration. Thus, the particle diameters of the dispersion, after one month of storage, still remained less than 0.45 μm. There was no detectable agglomeration of the particles after storage. Additionally, the absorption spectra both initially (FIG. 14), and after one month (FIG. 15), was found to be very similar, indicating that the particle dispersions are stable over time.

Therefore, this example demonstrates that particles containing anionic poly(phenylene ethynylene) polymers, when dispersed in water, remain stably dispersed, without precipitation.

EXAMPLE 9

Nonionic Poly(phenylene ethynylene)s

This example illustrates one set of embodiments of the invention, that include particles containing nonionic poly(phenylene ethynylene) polymers.

Figure 16:
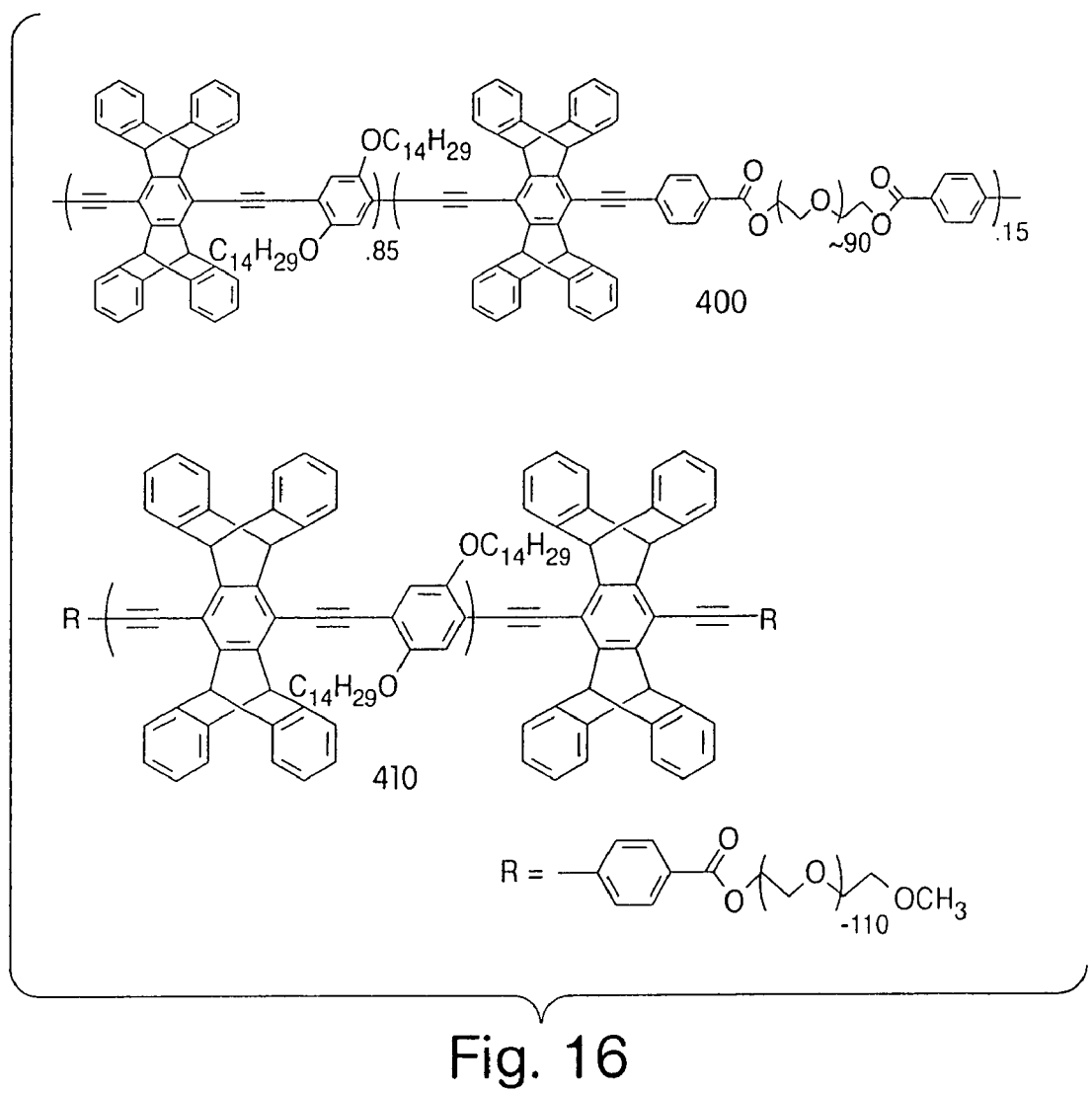
FIG. 16 illustrates certain chemical structures of the invention incorporating poly(ethylene) oxide.

Poly(phenylene ethynylene) 270 was prepared as previously described in Example 2. The polymer was then reacted with a poly(ethylene oxide) segment of a block copolymer, yielding block copolymer 400, as shown in FIG. 16. As another example, a poly(phenylene ethynylene) was prepared and reacted with a poly(ethylene oxide) to yield copolymer 410, which has poly(ethylene oxide) blocks at either terminus of the polymer backbone.

Figure 17:
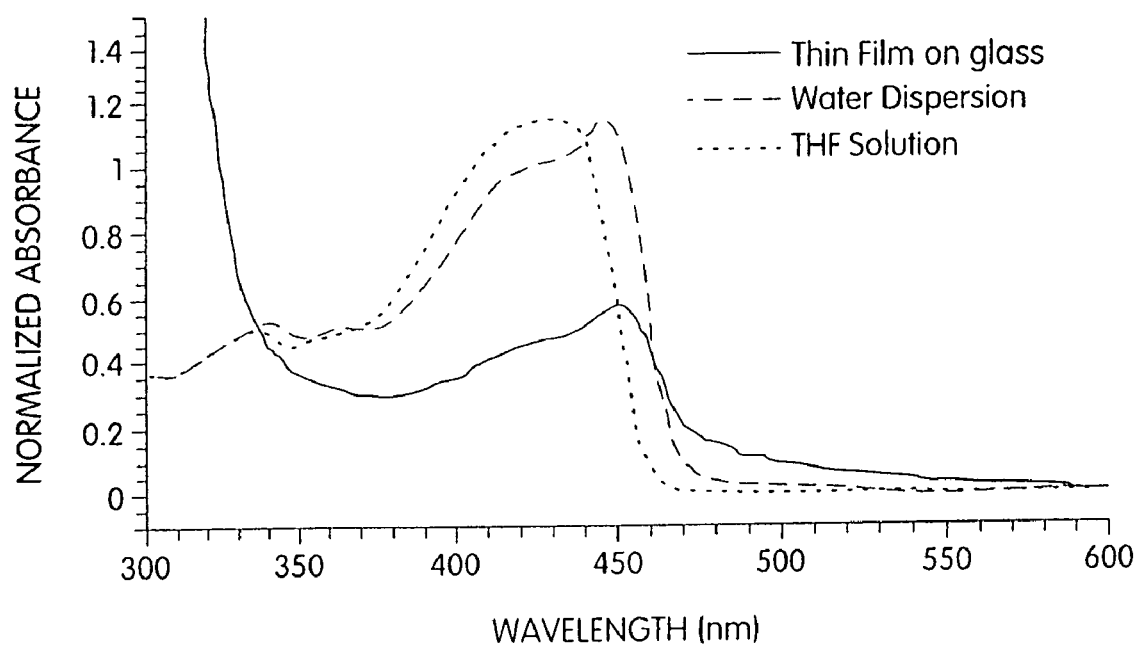
FIG. 17 is a graph of the absorbance spectra of certain molecules of the invention, illustrating physical properties of the molecules of the invention.

FIG. 17 shows the absorption spectra of copolymer 410 as a thin film on glass, as a dispersion in water, and as dissolved in tetrahydrofuran. The dispersion of copolymer 410 in water more closely resembles the solid state spectrum of copolymer 410 as a thin film on glass, than as dissolved in a solution of tetrahydrofuran. Thus, copolymer 410, when dispersed in water, behaves more like a solid state particle than as a solute in a solution.

Figure 18:
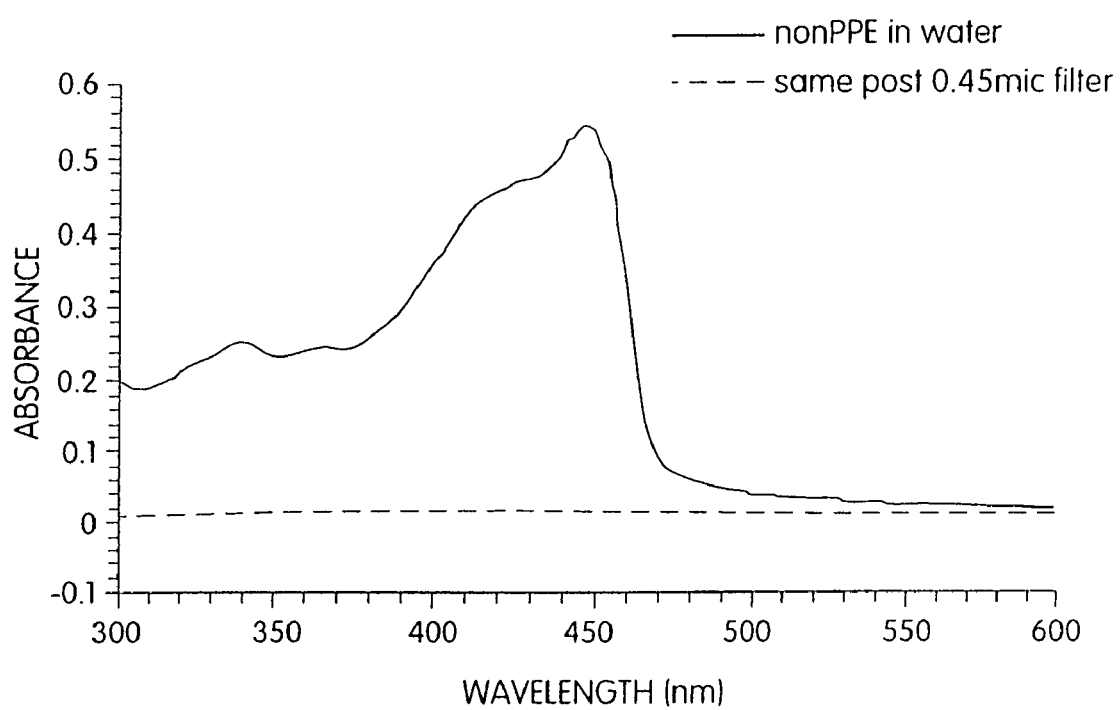
FIG. 18 is a graph of the absorbance spectra of certain embodiments of the invention after filtration, illustrating a particulate size of greater than 0.45 µm.

Copolymer 410, prepared in a dispersion using techniques similar to those previously described, was also filtered through a 0.45 μm filter. The absorption spectra of copolymer 410 is shown in FIG. 18. However, unlike the experiments illustrated in Example 7, filtration of the particles of copolymer 410 by a 0.45 μm filter resulted in a solution that did not have an observable spectrum after filtration. Thus, the particles of copolymer 410 in this example, unlike the anionic poly(phenylene ethynylene) copolymer particles previously described in Example 7, are larger than 0.45 μm.

Thus, in this example, it can be seen that nonionic poly(phenylene ethynylene) particles may be prepared and used in certain embodiments of the invention.

EXAMPLE 10

Cationic Poly(phenylene ethynylene)s

In this example, particles containing cationic poly(phenylene ethynylene)s were prepared and used.

Figure 19:
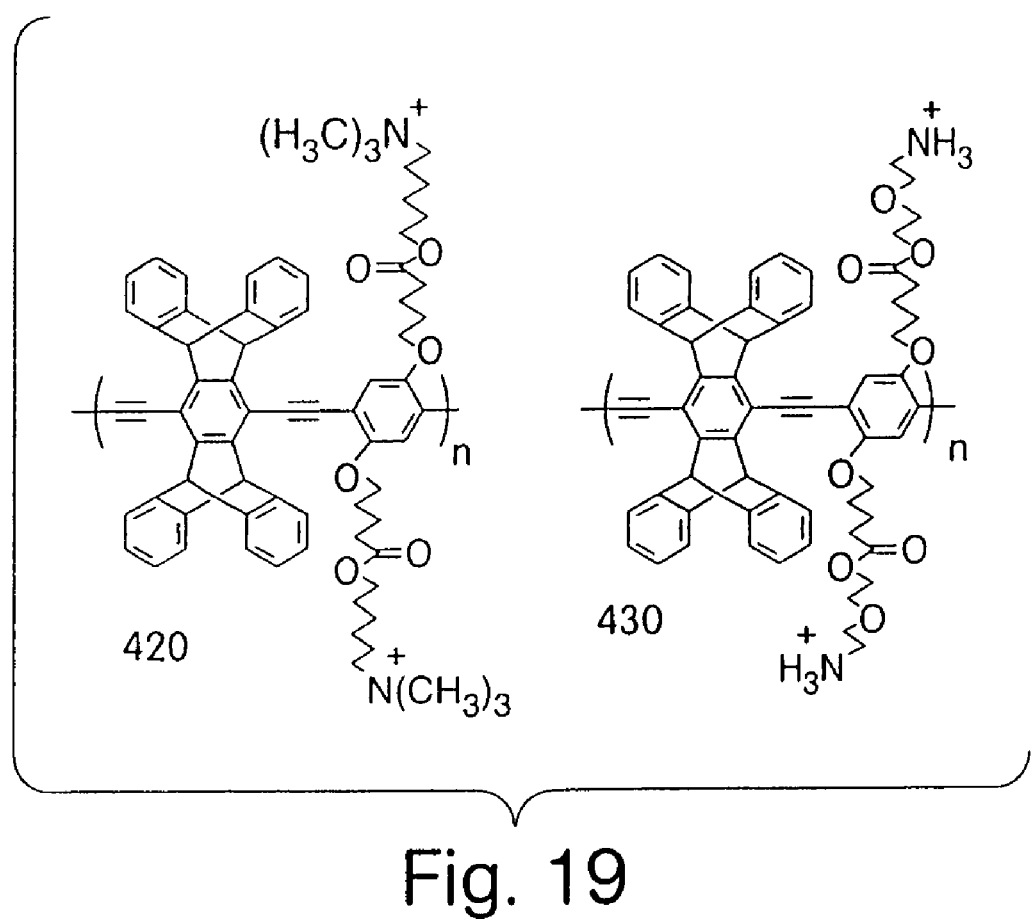
FIG. 19 illustrates molecules of the invention having positive charges.

Cationic poly(phenylene ethynylene)s 420, 430, as shown in FIG. 19, were prepared using techniques similar to those described previously in Example 1. The cationic poly(phenylene ethynylene)s were prepared as a dispersion, using techniques similar to those previously described.

Figure 20:
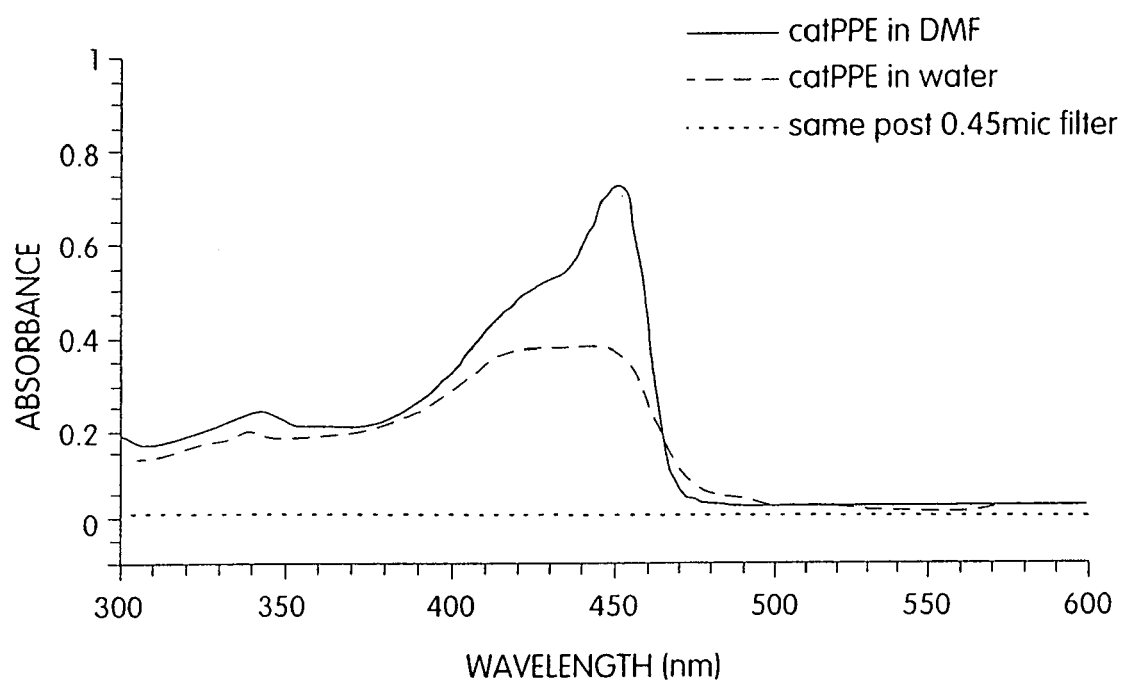
FIG. 20 illustrates cationic particles of the invention after filtration, illustrating a particulate size of greater than 0.45 µm.

FIG. 20 shows a absorption spectra of one particular cationic poly(phenylene ethynylene), as dissolved in dimethylformamide, as dispersed in water in particulate form, and as dispersed in water after filtration using a 0.45 μm filter. The absorption spectra of the cationic polymer, as dissolved in dimethylformamide, and as dispersed in water in particulate form appeared to be similar. However, no absorption spectra could be seen after the dispersion of particles containing the polymer was filtered through a 0.45 μm filter. In this example, the cationic poly(phenylene ethynylene) particles dispersed in water appear to have had a diameter greater than 0.45 μm, and were removed from suspension using a 0.45 μm filter.

Thus, this example illustrates particles containing cationic poly(phenylene ethynylene)s may be prepared and used in accordance with one set of embodiments of the invention.

While several embodiments of the invention have been described and illustrated herein, those of ordinary skill in the art will readily envision a variety of other means and structures for performing the functions and/or obtaining the results or advantages described herein, and each of such variations or modifications is deemed to be within the scope of the present invention. More generally, those skilled in the art would readily appreciate that all parameters, dimensions, materials, and configurations described herein are meant to be exemplary and that actual parameters, dimensions, materials, and configurations will depend upon specific applications for which the teachings of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not mutually inconsistent, is included within the scope of the present invention. In the claims, as well as in the specification above, all transitional phrases or phrases of inclusion, such as "comprising," "including," "carrying," "having," "containing," and the like are to be understood to be open-ended, i.e. to mean "including but not limited to." Only the transitional phrases or phrases of inclusion "consisting of" and "consisting essentially of" are to be interpreted as closed or semi-closed phrases, respectively.

What is claimed is:

1. The polymeric article, comprising:
a luminescent polymer in particulate form, wherein the luminescent polymer comprises a plurality of triple bonds and at least one aromatic group.

2. A polymeric article, comprising:
a luminescent polymer particle comprising a nucleic acid covalently attached to the luminescent polymer, wherein the luminescent polymer comprises a triple bond.

3. The polymeric article of claim 2, wherein the luminescent polymer comprises an iptycene moiety.

4. The polymeric article of claim 3, wherein the iptycene moiety comprises at least three arene planes.

5. The polymeric article of claim 4, wherein the iptycene moiety comprises at least five arene planes.

6. The polymeric article of claim 3, wherein the iptycene moiety is at least a portion of a repeat unit of the luminescent polymer.

7. The polymeric article of claim 2, wherein the luminescent polymer comprises a backbone.

8. The polymeric article of claim 7, wherein the backbone comprises a delocalized π-electron bond.

9. The polymeric article of claim 7, wherein the backbone comprises a benzene ring.

10. The polymeric article of claim 9, wherein the benzene ring is at least a portion of a repeat unit of the backbone of the luminescent polymer.

11. The polymeric article of claim 9, wherein a pendant group is attached to the backbone via the benzene ring.

12. The polymeric article of claim 7, wherein the triple bond is at least a portion of a repeat unit of the luminescent polymer.

13. The polymeric article of claim 2, wherein the luminescent polymer comprises a plurality of triple bonds.

14. The polymeric article of claim 2, wherein the luminescent polymer comprises a copolymer formed from a plurality of monomers, wherein at least one monomer comprises a structure:

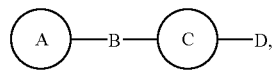

wherein at least one of A and C comprises a bicyclic ring system, and at least one of B and D comprises a triple bond.

15. The polymeric article of claim 2, wherein the particle is formed from the luminescent polymer, and wherein the nucleic acid is attached to the luminescent polymer.

16. The polymeric article of claim 7, wherein the luminescent polymer comprises at least one pendant group.

17. The polymeric article of claim 16, wherein the pendant group comprises an aliphatic chain.

18. The polymeric article of claim 16, wherein the pendant group comprises an ether chain.

19. The polymeric article of claim 2, wherein the luminescent polymer comprises a charged moiety.

20. The polymeric article of claim 2, wherein the particle includes a coating.

21. The polymeric article of claim 1, wherein the particle comprises a moiety that is able to become to a biological, biochemical, and/or chemical molecule.

22. An article, comprising:
a luminescent polymer particle comprising a nucleic acid wherein the luminescent polymer is a copolymer and comprises a triple bond.

23. The polymeric article of claim 21 wherein the luminescent polymer comprises the moiety that is able to become attached to a biological, biochemical, and/or chemical molecule so as to form, upon attachment, a particle comprising the luminescent polymer attached to the biological, biochemical, and/or chemical molecule.

24. The polymeric article of claim 23 further comprising:
the biological, biochemical, and/or chemical molecule attached to the luminescent polymer.

25. The polymeric article of claim 24, wherein the biological, biochemical, and/or chemical molecule is a nucleic acid molecule.

26. A method, comprising:
allowing a nucleic acid to become covalently attached to a luminescent polymer, wherein the luminescent polymer comprises a triple bond.

27. The method of claim 26, wherein the luminescent polymer comprises a plurality of triple bonds.

28. The method of claim 26, wherein the luminescent polymer comprises a copolymer formed from a plurality of monomers, wherein at least one monomer comprises a structure:

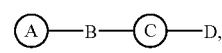

wherein at least one of A and C comprises a bicyclic ring system, and at least one of B and D comprises a triple bond.

29. An article, comprising:
a luminescent polymer particle comprising a nucleic acid, wherein the luminescent polymer comprises a triple bond, and wherein the particle luminesces when comprising the nucleic acid.

30. A polymeric article, comprising:
a particle consisting essentially of a luminescent polymer, wherein the luminescent polymer comprises a plurality of triple bonds.

* * * * *